(12) United States Patent
Nohara et al.

(10) Patent No.: US 11,320,660 B2
(45) Date of Patent: May 3, 2022

(54) VEHICLE DISPLAY DEVICE AND DISPLAY CONTROL DEVICE

(71) Applicant: DENSO CORPORATION, Kariya (JP)

(72) Inventors: Masafumi Nohara, Kariya (JP); Yoshio Oofuka, Kariya (JP)

(73) Assignee: DENSO CORPORATION, Kariya (JP)

( * ) Notice: Subject to any disclaimer, the term of this patent is extended or adjusted under 35 U.S.C. 154(b) by 40 days.

(21) Appl. No.: 16/741,942

(22) Filed: Jan. 14, 2020

(65) Prior Publication Data

US 2020/0150444 A1 May 14, 2020

Related U.S. Application Data

(63) Continuation of application No. PCT/JP2018/025291, filed on Jul. 4, 2018.

(30) Foreign Application Priority Data

Jul. 19, 2017 (JP) .............................. JP2017-140168
Jul. 25, 2017 (JP) .............................. JP2017-143909
Jun. 11, 2018 (JP) .............................. JP2018-111301

(51) Int. Cl.
*G02B 27/01* (2006.01)
*B60R 1/00* (2022.01)
*B60K 35/00* (2006.01)

(52) U.S. Cl.
CPC .......... *G02B 27/0179* (2013.01); *B60K 35/00* (2013.01); *B60R 1/00* (2013.01); *B60K 2370/155* (2019.05); *B60K 2370/1529* (2019.05); *B60R 2300/308* (2013.01); *B60R 2300/605* (2013.01); *G02B 2027/0187* (2013.01)

(58) Field of Classification Search
CPC .... G02B 2027/0181; G02B 2027/0187; G02B 27/0179
See application file for complete search history.

(56) References Cited

U.S. PATENT DOCUMENTS

| 10,613,337 | B2* | 4/2020 | Li | G02B 27/0093 |
| 10,818,172 | B2* | 10/2020 | Tan | B60Q 9/00 |
| 2008/0077321 | A1* | 3/2008 | Widodo | G01C 21/32 |
| | | | | 701/29.5 |
| 2010/0157430 | A1* | 6/2010 | Hotta | G02B 27/01 |
| | | | | 359/630 |
| 2016/0216521 | A1* | 7/2016 | Yachi | G02B 27/0179 |

FOREIGN PATENT DOCUMENTS

| JP | 2007030531 A | 2/2007 |
| JP | 2010058633 A | 3/2010 |
| WO | WO-2019021725 A1 | 1/2019 |

* cited by examiner

*Primary Examiner* — William Boddie
*Assistant Examiner* — Bipin Gyawali
(74) *Attorney, Agent, or Firm* — Harness, Dickey & Pierce, P.L.C.

(57) ABSTRACT

A vehicle display device includes a display portion attached to a vehicle. The vehicle display device acquires a position of a viewpoint-related part provided by a viewpoint of a driver or a point that moves together with the viewpoint. The vehicle display device acquires image data for generating a display image to be displayed on the display portion. The vehicle display device generates the display image based on the image data and display the display image on the display portion.

12 Claims, 21 Drawing Sheets

COMPARATIVE EXAMPLE

COMPARATIVE EXAMPLE

VEHICLE DISPLAY DEVICE AND DISPLAY CONTROL DEVICE

CROSS REFERENCE TO RELATED APPLICATIONS

The present application is a continuation application of International Patent Application No. PCT/JP2018/025291 filed on Jul. 4, 2018, which designated the U.S. and claims the benefit of priority from Japanese Patent Application No. 2017-140168 filed on Jul. 19, 2017, Japanese Patent Application No. 2017-143909 filed on Jul. 25, 2017, and Japanese Patent Application No. 2018-111301 filed on Jun. 11, 2018. The entire disclosures of all of the above applications are incorporated herein by reference.

TECHNICAL FIELD

The present disclosure relates to a vehicle display device that displays various images on a display portion attached to a vehicle and a display control device that displays an instrument image that indicates vehicle information on a monitor mounted on a vehicle.

BACKGROUND

A device that displays various images on a display portion attached to a vehicle has been proposed.

SUMMARY

The present disclosure provides a vehicle display device. The vehicle display device includes a display portion attached to a vehicle. The vehicle display device acquires a position of a viewpoint-related part provided by a viewpoint of a driver or a point that moves together with the viewpoint. The vehicle display device acquires image data for generating a display image to be displayed on the display portion. The vehicle display device generates the display image based on the image data and display the display image on the display portion.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
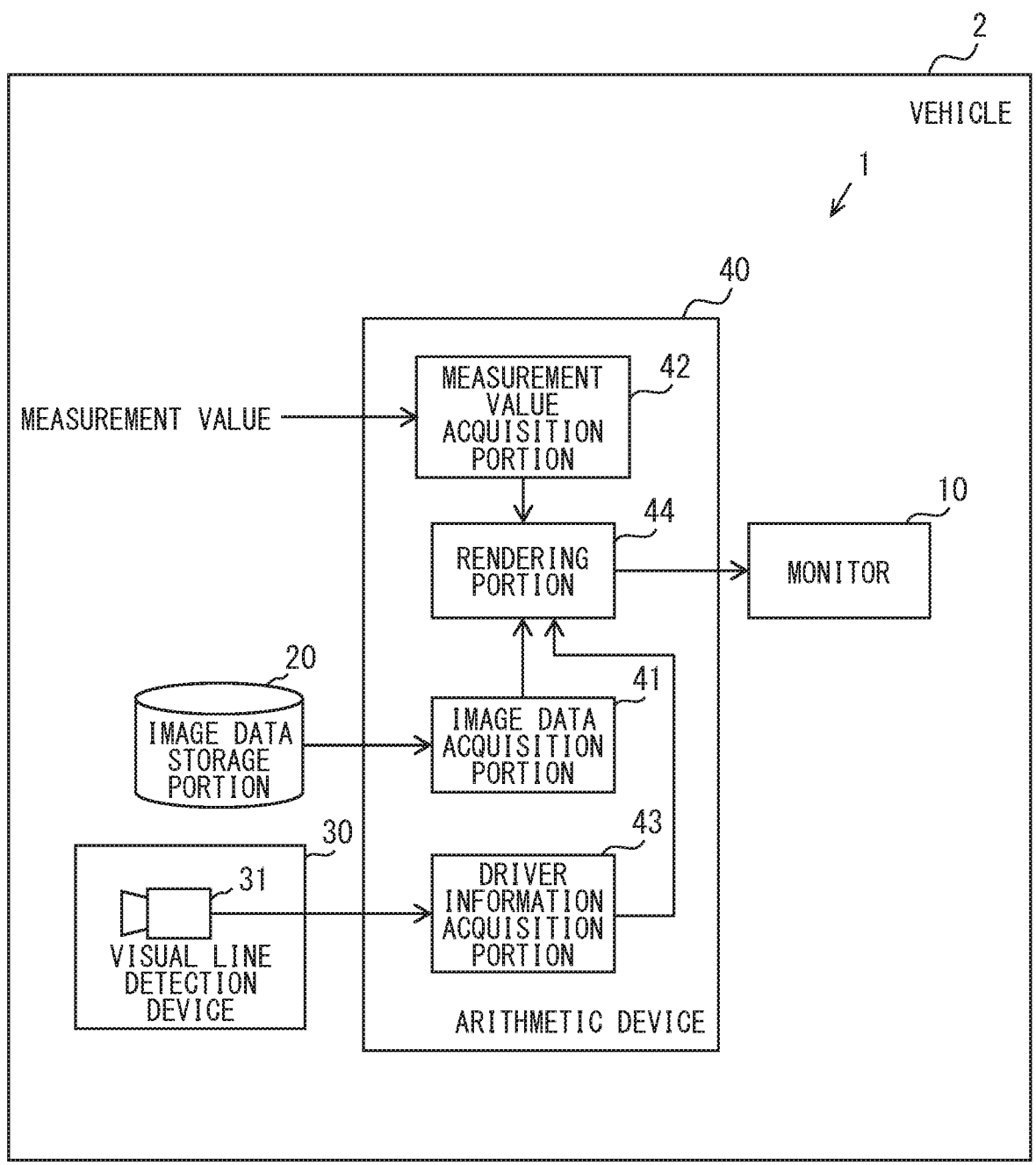
FIG. 1 is a block diagram illustrating a configuration of a vehicle display device according to a first embodiment.

For example, a device displays an instrument image on a display portion attached to a vehicle. The device changes the shape of the instrument image to a shape viewed from the viewpoint of a driver as the viewpoint of the driver moves. Throughout the present specification, the viewpoint signifies the position of an eye as the reference point of a visual line, not a point at which the visual line is targeted.

A display control device causes a monitor to display images of instruments such as a speedometer and a tachometer representing information (hereinafter referred to as vehicle information) about vehicle travel control.

A configuration that represents a 3D shape (hereinafter referred to as a stereoscopic instrument model) of each instrument in a virtual 3D space based on 3D shape data of each instrument to be displayed on the monitor has been proposed. An image corresponding to the stereoscopic instrument model viewed from the visual line direction of an occupant is displayed on the monitor. The display control device specifies the direction of the light entering the monitor and displays the instrument image along with a display face that includes a scale and a numeric value as well as a pointer shadow generated by the incident light.

The present disclosure provides a vehicle display device capable of giving realistic sensation to a driver and reducing difficulty in reading necessary information.

The present disclosure provides a display control device capable of displaying a three-dimensional instrument image and reducing degradation of the visibility of vehicle information due to the separation between a display face and a pointer.

An example embodiment of the present disclosure provides a vehicle display device. The vehicle display device includes a display portion attached to a vehicle, a driver information acquisition portion, an image data acquisition portion, and a rendering portion. The driver information acquisition portion acquires a position of a viewpoint-related part provided by a viewpoint of a driver or a point that moves together with the viewpoint. The image data acquisition portion acquires image data for generating a display image to be displayed on the display portion. The rendering portion generates the display image based on the image data and display the display image on the display portion. The image data is classified into movement suppression image data and movement promotion image data. The rendering portion determines a movement amount of the display image generated from the movement promotion image data based on a change amount in the position of the viewpoint-related part. The rendering portion causes the movement amount of the display image generated from the movement promotion image data to be greater than a movement amount of the display image generated from the movement suppression image data.

In the example embodiment of the present disclosure, with the vehicle display device, the display image generated from the movement promotion image data is determined based on the amount of change in the position of the viewpoint-related part. The movement amount of the display image generated from the movement promotion image data is greater than the movement amount of the display image generated from the movement suppression image data. Therefore, it is possible to give realistic sensation to a driver compared to a case where the movement amount of all display images is equal to the movement amount of display images generated from the movement suppression image data. The movement amount of display images generated from the movement suppression image data is smaller than the movement amount of the movement promotion image data. Image data needed to read necessary information is classified as the movement suppression image data, suppressing difficulty in reading the necessary information.

Another example embodiment of the present disclosure provides a vehicle display device. The vehicle display device includes a display portion, a vehicle acceleration acquisition portion, an image data acquisition portion, and a rendering portion. The display portion is attached to a vehicle. The vehicle acceleration acquisition portion acquires an acceleration occurring on the vehicle. The image data acquisition portion acquires image data for generating a display image to be displayed on the display portion. The rendering portion generates the display image based on the image data and display the display image on the display portion. The image data is classified into movement suppression image data and movement promotion image data. The rendering portion determines a movement amount of the display image generated from the movement promotion image data based on the acceleration acquired by the vehicle acceleration acquisition portion. The rendering portion causes the movement amount of the display image generated from the movement promotion image data to be greater than a movement amount of the display image generated from the movement suppression image data.

In the example embodiment of the present disclosure, with the vehicle display device, a display image generated from the movement promotion image data is determined based on an acceleration occurring on the vehicle. The movement amount of the display image generated from the movement promotion image data is greater than the movement amount of the display image generated from the movement suppression image data. Therefore, it is possible to give realistic sensation to a driver compared to a case where the movement amount of all display images is equal to the movement amount of display images generated from the movement suppression image data. The movement amount of display images generated from the movement suppression image data is smaller than the movement amount of the movement promotion image data. Image data needed to read necessary information is classified as the movement suppression image data, suppressing difficulty in reading the necessary information.

Another example embodiment of the present disclosure provides a display control device. The display control device causes a monitor mounted on a vehicle to display an image of an instrument that indicates predetermined vehicle information related to a travel control of the vehicle. The display control device includes a vehicle information acquisition portion, a stereoscopic instrument model generation portion, and a rendering portion. The vehicle information acquisition portion acquires the vehicle information. The stereoscopic instrument model generation portion generates, as a stereoscopic model of the instrument, a stereoscopic instrument model by combining a base plate object, a plurality of scale objects, and a pointer object. The base plate object is provided as a stereoscopic model of a base plate representing an exterior configuration of a scale face of the instrument. Each of the plurality of scale objects is provided as a stereoscopic model of corresponding one of a plurality of scales provided for the scale face. The pointer object is provided as a stereoscopic model of a pointer of the instrument and including a pointer body portion. The rendering portion causes the monitor to display an image of the stereoscopic instrument model. The stereoscopic instrument model generation portion places the pointer body portion of the pointer object in a plane that faces the base plate object at a predetermined separation distance. The pointer body portion of the pointer object points a state corresponding to the vehicle information acquired by the vehicle information acquisition portion. The stereoscopic instrument model generation portion causes at least one of the plurality of scale objects closest to the pointer object to protrude from the base plate object for a predetermined amount equal to or smaller than the separation distance.

In the example embodiment of the present disclosure, with the display control device, the stereoscopic instrument model generation portion generates the stereoscopic model (or the stereoscopic instrument model) for the instrument so that the stereoscopic model allows at least the scale close to the pointer to protrude from the base plate. The stereoscopic model causes the distance between the pointer and the scale close to the pointer in depth to be smaller than the separation distance between the base plate and the pointer.

It is possible to inhibit the visibility of vehicle information from degrading due to the separation between the base plate and the pointer. The base plate here signifies a member comparable to the above-mentioned display face devoid of the scales. Namely, the separation between the base plate and the pointer is comparable to the separation between the display face and the pointer.

A predetermined separation distance is provided as a gap between the base plate and the pointer body portion. The stereoscopic instrument model can express a sense of depth corresponding to the separation distance. A sense of depth can be expressed more effectively because the above-mentioned configuration uses the mode to display also the scale object itself to protrude from the base plate. This mode of displaying instrument images can give a three-dimensional appearance to the occupant.

The above-mentioned configuration can display three-dimensional instrument images and inhibit the visibility of vehicle information from degrading due to the separation between the display face and the pointer.

In order to provide a driver with more realistic sensation, it may be thought that an image displayed on the display portion moves more massively in response to movement of the viewpoint or the head of a driver or a vehicle acceleration causing the viewpoint or the head to move. However, when an image displayed on the display portion is massively moved in a case where the viewpoint of the driver moves, the image degrades the visibility. The configuration may cause the driver to less easily read necessary information such as the vehicle speed displayed on a speedometer.

A tangible, that is, actual analog meter generally includes a pointer placed opposite to a display face to leave a constant distance from the display face so that the pointer can rotate. In other words, a gap of the constant distance is provided in depth between the display face and a plane to rotate the pointer.

When an occupant views the monitor slantwise in the configuration that reproduces the distance between the display face and the pointer, a scale attached to the display face and the pointer are displayed to be misaligned, making it possible to give a three-dimensional appearance to the occupant.

There is an effect of giving a three-dimensional appearance when the display face and the pointer are placed apart and the scale and the pointer are misaligned due to positions of the occupant's eye. However, the configuration may hinder accurate correspondence between the scale (or a numeric value) and the pointer.

The positional displacement between the scale and the pointer can be reduced by decreasing the distance between the display face and the pointer even when an occupant views the monitor slantwise, for example. However, a decrease in the distance between the display face and the pointer decreases a variation in the display mode corresponding to the occupant's eye position (or head position) and decreases the value of dynamic display control by taking account of occupant's eye positions.

An appropriately large distance between the display face and the pointer is advantageous for the display control taking account of occupant's eye positions. Then, it is possible to increase the degree of variations in the display mode corresponding to the occupant's eye positions and give a three-dimensional appearance to a driver.

In the above-mentioned example, the pointer and the scale are viewed to be misaligned in the configuration to display a three-dimensional model viewed from the driver's viewpoint on condition that the occupant viewpoint exists along a direction (such as slantwise) other than a front direction for the monitor, but not limited thereto. The same concept also applies to a configuration that displays an image of a three-dimensional model placed in a predetermined posture regardless of the driver's viewpoint in terms of the aesthetic appearance and displays a stereoscopic instrument model including the display face postured slantwise against the display surface of the monitor.

First Embodiment

Embodiments will be described based on the accompanying drawings. FIG. 1 illustrates a configuration of a vehicle display device 1 according to a first embodiment. The vehicle display device 1 is mounted on a vehicle 2. The vehicle display device 1 includes a monitor 10, an image data storage portion 20, a visual line detection device 30, and an arithmetic device 40.

The monitor 10, which corresponds to a display portion, is installed on an instrument panel of the vehicle 2 and displays various information about the vehicle 2. The information is displayed as an image. An image displayed on the monitor 10 is hereinafter referred to as a display image. The Display image include not only photos representing shapes in detail but also geometric figures, illustrations, and drawings. The monitor 10 also displays a character as the display image.

The image data storage portion 20 stores data (image data) to generate various display images displayed on the monitor 10. The display image also include a three-dimensionally displayed image. A three-dimensional shape is stored as image data for a three-dimensionally displayed image.

Figure 2:
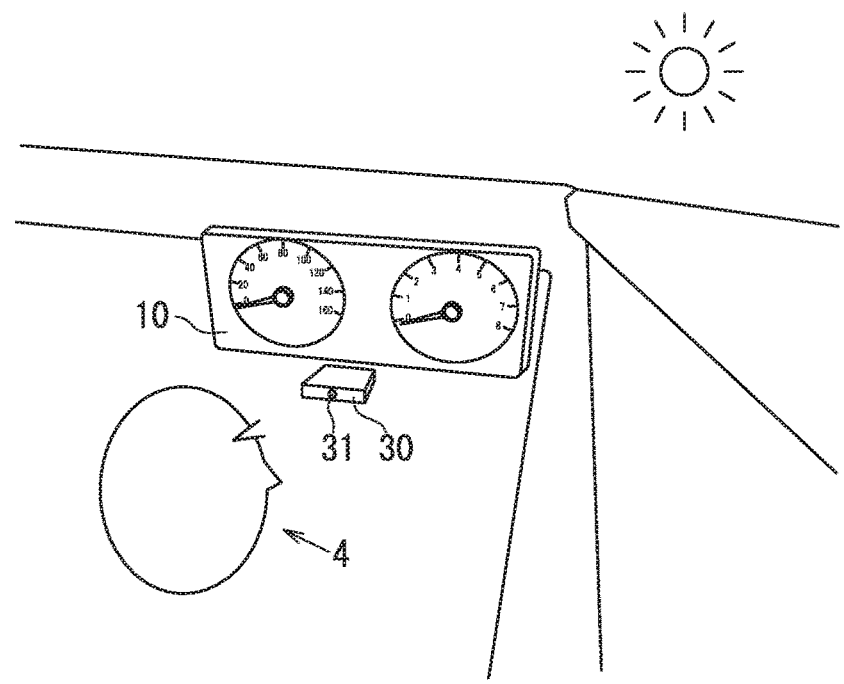
FIG. 2 is a diagram illustrating the installation of a visual line detection device.

The visual line detection device 30 detects a driver's viewpoint and visual line. For this purpose, the visual line detection device 30 includes a camera 31. FIG. 2 illustrates an installation of the visual line detection device 30. According to the example of FIG. 2, the visual line detection device 30 is placed below the monitor 10. A capturing range of the camera 31 included in the visual line detection device 30 is set to include a driver's head 4. The installation of the visual line detection device 30 is not limited to the position illustrated in FIG. 2. The visual line detection device 30 may be installed at a position other than the position illustrated in FIG. 2 if the driver's head 4 can be captured.

The visual line detection device 30 analyzes an image captured by the camera 31 and detects the driver's eye position. More specifically, positions of a reference point and a moving point of the eye are detected. There is a known method that assumes an inner corner of the eye to be the reference point of the eye and an iris to be the moving point of the eye and detects a visual line based on the positional relationship therebetween. There is another known method that assumes a corneal reflex to be the reference point of the eye and a pupil to be the moving point of the eye and detects a visual line based on the positional relationship therebetween.

The arithmetic device 40 represents a computer including a CPU, RAM, ROM, I/O, and a bus line connecting these components. The ROM stores a program executed by the CPU. The program just needs to be stored in a non-transitory tangible storage medium that is not limited to the ROM as a specific storage medium. The program may be stored in flash memory, for example. Execution of a program by the CPU is comparable to the execution of a method corresponding to the program.

The arithmetic device 40 allows the CPU to execute a program stored in the ROM and thereby provides functions as an image data acquisition portion 41, a measurement value acquisition portion 42, a driver information acquisition portion 43, and a rendering portion 44 as illustrated in FIG. 1. All or part of the function blocks included in the arithmetic device 40 may be provided as one or more ICs (as hardware). All or part of the functions included in the arithmetic device 40 may be provided by a combination of execution of the software on the CPU and hardware components.

Figure 3:
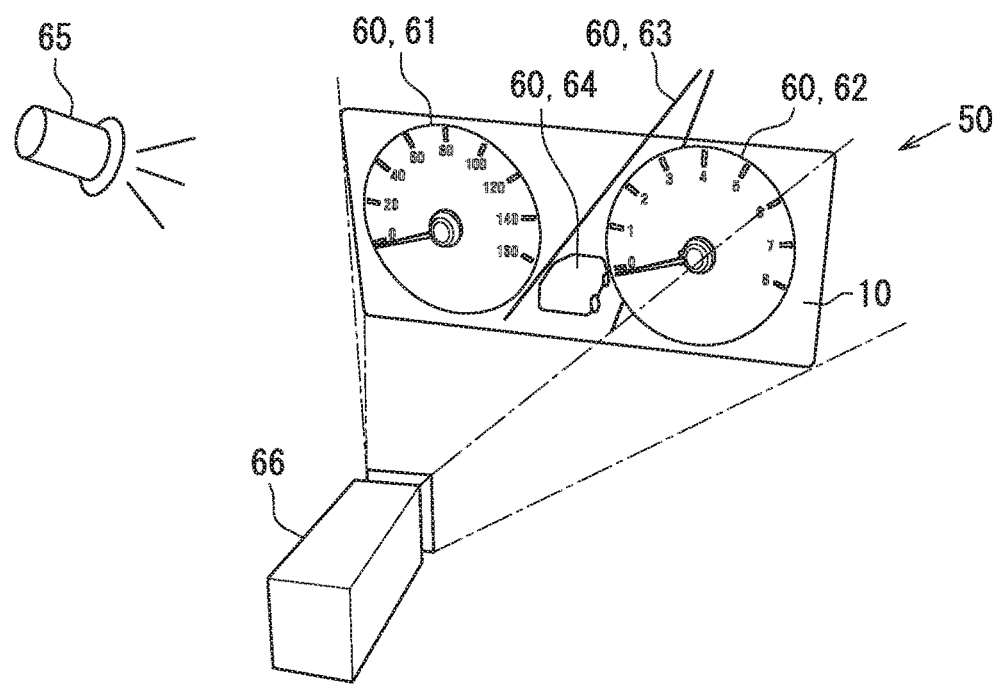
FIG. 3 is a diagram illustrating display objects placed in a virtual space.

The image data acquisition portion 41 acquires image data from the image data storage portion 20. FIG. 3 illustrates a display object 60 placed in a virtual space 50. The image data acquisition portion 41 acquires image data of the display object 60.

According to the present embodiment, the monitor 10 displays display images, namely, images that correspond to the display objects 60 placed in the virtual space 50 and are viewed from a virtual viewpoint. The display objects 60 are comparable to objects displayed on the monitor 10. Specifically, the display objects 60 illustrated in FIG. 3 include a speedometer dial face 61, a tachometer dial face 62, a road 63, and a vehicle 64. The vehicle 64 conceptually represents a subject vehicle. The above is an example. The display object 60 may include objects other than those illustrated in FIG. 3. For example, the display object 60 may include various instruments such as a fuel gauge and a water temperature gauge. The image data acquisition portion 41 acquires image data of the display objects 60.

An illumination 65 and a camera 66 are also placed in the virtual space 50 illustrated in FIG. 3. The illumination 65 represents the sunlight. The camera 66 represents the driver's viewpoint and visual line. The monitor 10 displays an image captured by the camera 66 as a display image. The camera 66 placed in the virtual space 50 signifies a virtual viewpoint.

The measurement value acquisition portion 42 acquires a measurement value represented by the display object 60. The example in FIG. 3 includes the speedometer dial face 61 and the tachometer dial face 62 as the display objects 60. Therefore, the measurement value acquisition portion 42 acquires a vehicle speed and an engine speed as measurement values. The measurement values are acquired from sensors that detect the measurement values.

The driver information acquisition portion 43 acquires the driver's viewpoint position. The visual line detection device 30 successively detects the driver's viewpoint positions. Therefore, the driver information acquisition portion 43 successively acquires the driver's viewpoint position from the visual line detection device 30. The viewpoint provides an example of a viewpoint-related part.

The rendering portion 44 successively generates the display image based on the image data acquired by the image data acquisition portion 41, the measurement value successively acquired by the measurement value acquisition portion 42, and the driver's viewpoint position successively acquired by the driver information acquisition portion 43.

Figure 4:
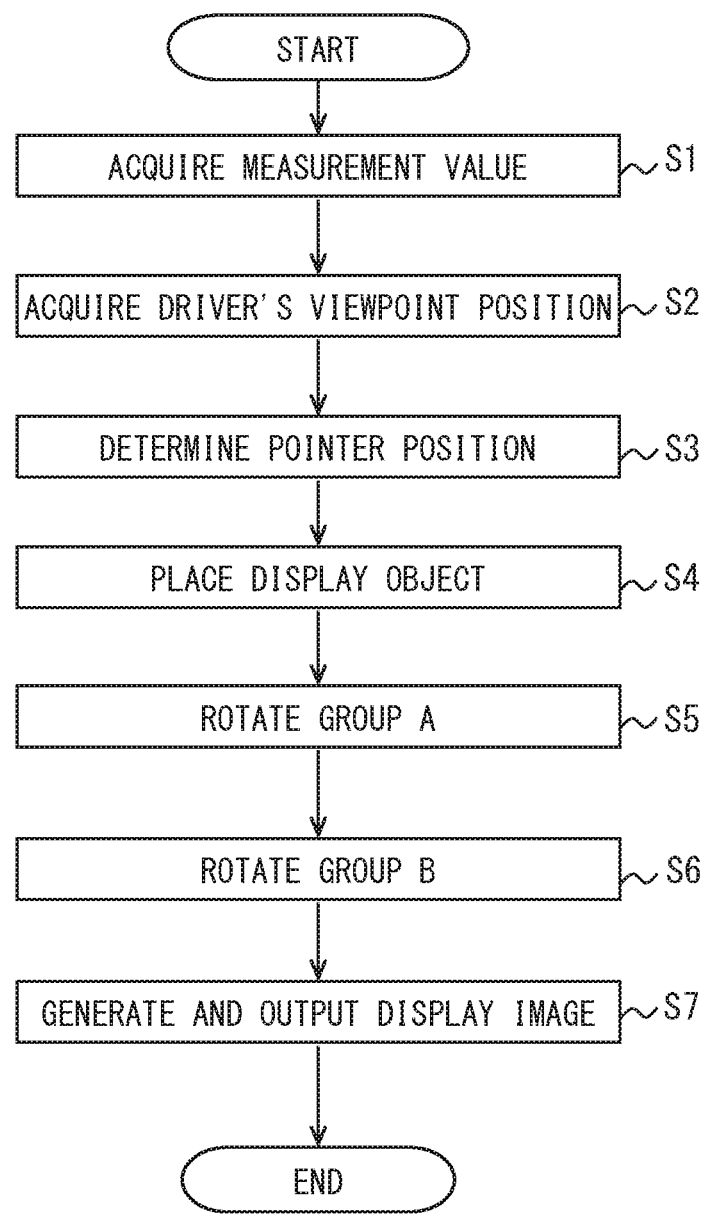
FIG. 4 is a flowchart illustrating a process performed by a rendering portion in FIG. 1.

The rendering portion 44 displays the generated display image on the monitor 10. The description below explains a process performed by the rendering portion 44 by using a flowchart illustrated in FIG. 4. In FIG. 4, the measurement value acquisition portion 42 performs the process in S1 and the driver information acquisition portion 43 performs the process in S2. The rendering portion 44 performs the process in S3 and later.

The process in FIG. 4 is periodically performed after fulfillment of a condition to display the display image on the monitor 10 such as turning on a power supply of the vehicle 2 while the image data acquisition portion 41 acquires the image data.

In S1, the process acquires a measurement value. In S2, the process acquires the driver's viewpoint position. In S3, the process determines the position of a pointer of the display object 60 including the pointer out of the display objects 60 placed in the virtual space 50 based on the measurement value acquired in S1.

In S4, the process places the display object 60 reflecting the pointer position determined in S3 in the virtual space 50. In S5 and S6, the process allows the monitor 10 to display an image of the display object 60 viewed from the camera 66. The display object 60 is rotated based on an angle change in the driver's viewpoint position. The present embodiment classifies the display objects 60 into groups A and B. Group A uses a rotation angle smaller than a change angle θ at the driver's viewpoint position. Group B uses a rotation angle greater than the change angle θ at the driver's viewpoint position.

Figure 8:
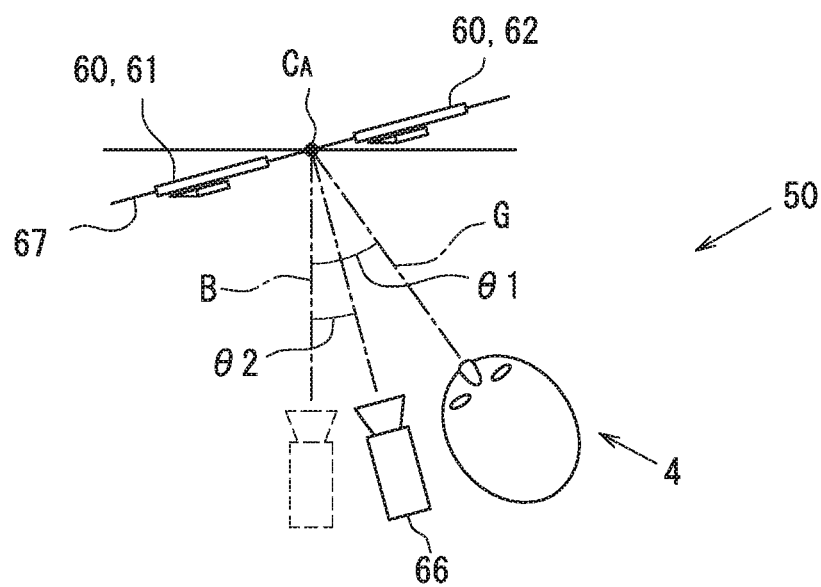
FIG. 8 is a diagram illustrating a rotation angle $\theta 2$ for a speedometer dial face 61 and a tachometer dial face corresponding to a change angle $\theta 1$ at a driver viewpoint.
Figure 10:
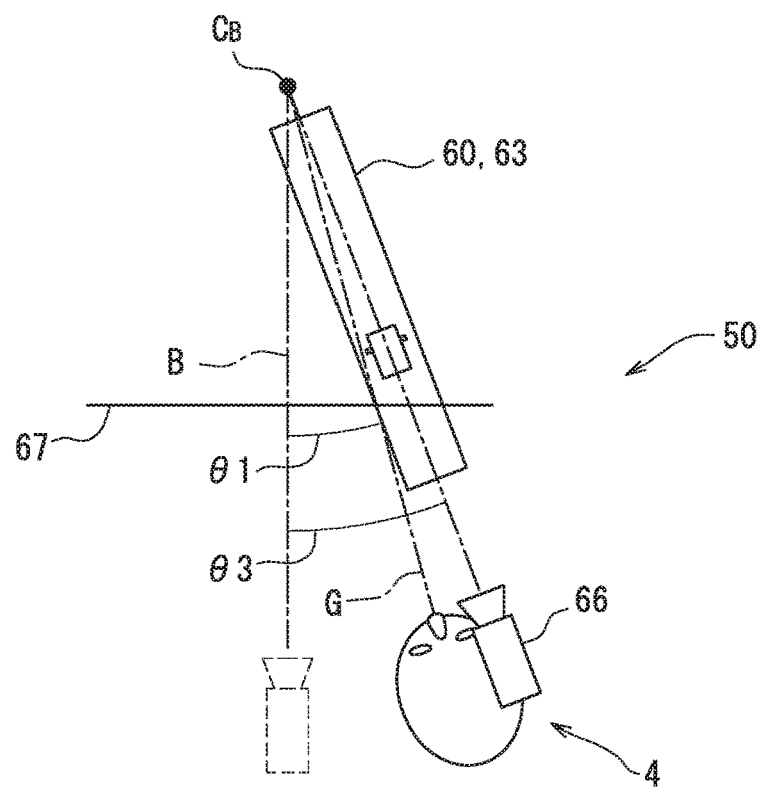
FIG. 10 is a diagram illustrating a rotation angle $\theta 3$ for a road and a vehicle corresponding to the change angle $\theta 1$ at a driver viewpoint.

According to the present embodiment, the change angle θ is formed between a reference line segment B and a line segment G that connects an intermediate position between both eyes of the driver, namely, the center of the head 4 in the horizontal direction, with the rotation center C defined for each display object 60. The reference line segment B connects the rotation center with the intermediate position between both eyes of the driver when the intermediate position between both eyes of the driver corresponds to a reference position. The reference position passes through the steering center and is included in a vertical plane parallel to a front-back direction of the vehicle, for example. FIGS. 8 and 10 illustrate line segment G and reference line segment B.

The image data classified as group A includes pointer positions from which information needs to be read. The necessity to read information signifies the necessity to recognize a slight difference in shape positions or the necessity to recognize a slight difference in shapes. The necessity to recognize a slight difference in shape positions is applied to the pointer position. The necessity to recognize a difference in shapes is applied to characters.

The image data classified as group B allows a driver to eliminate the need to read the information or an increased need to read the information in a short time. The image data classified as group A is comparable to movement suppression image data. The image data classified as group B is comparable to movement promotion image data. According to the example in FIG. 3, image data of the speedometer dial face 61 and the tachometer dial face 62 are classified as group A and image data of the road 63 and the vehicle 64 are classified as group B.

In S5, the process rotates the display object 60 represented by image data belonging to group A. The process rotates the display object 60 in group A by an angle resulting from multiplying change angle θ at the driver's viewpoint position and a positive coefficient smaller than 1. A specific value of the positive coefficient is determined based on experiments by taking account of a balance between the insurance of visibility and the improvement of realistic sensation or drivability.

Figure 5:
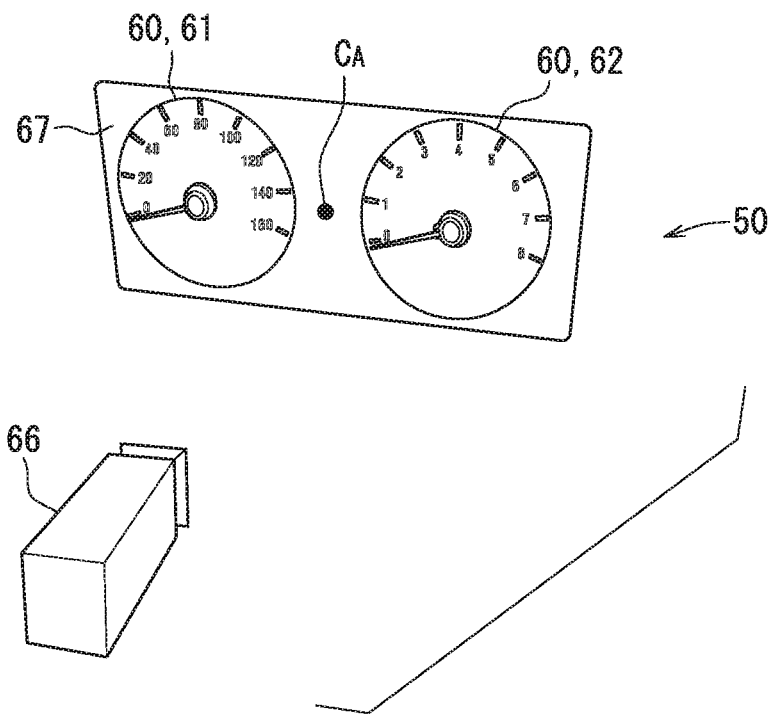
FIG. 5 is a diagram illustrating a rotation center $C_A$ of a speedometer dial face and a tachometer dial face.

FIG. 5 illustrates rotation center $C_A$ for the speedometer dial face 61 and the tachometer dial face 62. The speedometer dial face 61 and the tachometer dial face 62 are placed on the same plane. This plane is hereinafter referred to as a meter placement plane 67. Rotation center $C_A$ is included in the meter placement plane 67. More specifically, rotation center $C_A$ is positioned at the middle between the speedometer dial face 61 and the tachometer dial face 62 on the meter placement plane 67.

In S6, the process rotates the display object 60 represented by image data belonging to group B. The process rotates the display object 60 in group B by an angle resulting from multiplying change angle θ at the driver's viewpoint position and a positive coefficient greater than 1. A specific value of the positive coefficient to determine the rotation angle for group B is also determined based on experiments by taking account of a balance between the insurance of visibility and the improvement of realistic sensation or drivability.

Figure 6:
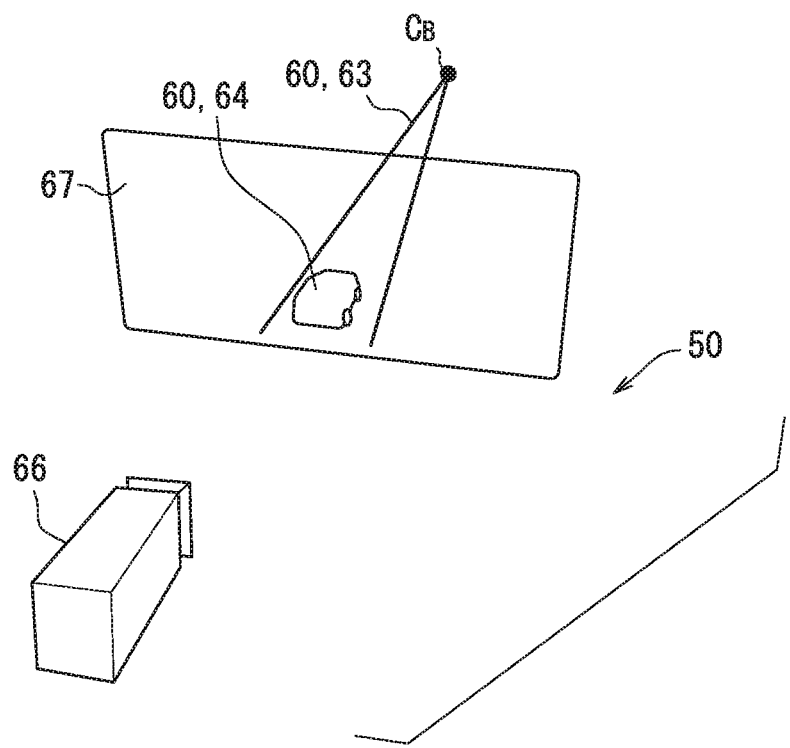
FIG. 6 is a diagram illustrating a rotation center of a road and a vehicle.

FIG. 6 illustrates rotation center $C_B$ for the road 63 and the vehicle 64. Rotation center $C_B$ is positioned as ahead as possible in the virtual space 50. The position ahead goes away from the camera 66 in a capturing direction for the camera 66 positioned at the 0-degree angle. Rotation center $C_B$ is positioned at a vanishing point in the virtual space 50, for example. The road 63 as a long shape in depth is positioned in the direction toward the vanishing point.

Figure 7:
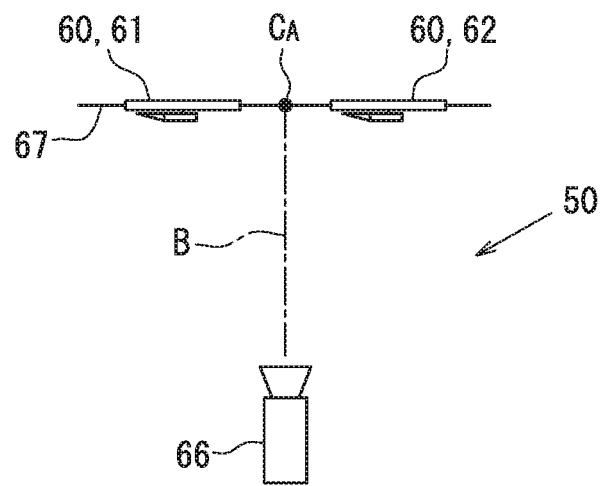
FIG. 7 is a diagram illustrating the speedometer dial face and the tachometer dial face corresponding to a viewpoint position at zero degrees.
Figure 9:
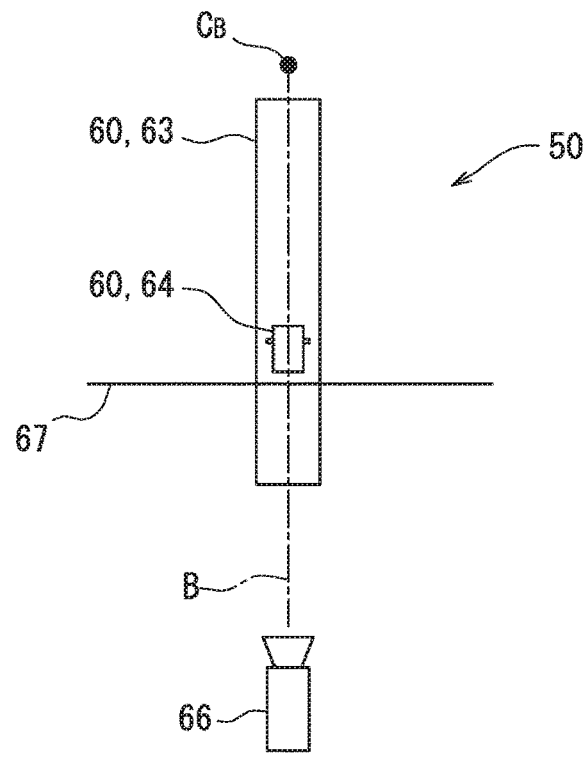
FIG. 9 is a diagram illustrating a road and a vehicle corresponding to a viewpoint position at zero degrees.

FIG. 7 illustrates the speedometer dial face 61 and the tachometer dial face 62 at viewpoint position 8 set to zero degrees. FIG. 7 also illustrates reference line segment B. FIG. 7 is a plan view of the virtual space 50 viewed from above. FIGS. 8 through 10 are also diagrams illustrating the virtual space 50 viewed from above. FIG. 7 illustrates a reference orientation of the speedometer dial face 61 and the tachometer dial face 62. In FIG. 7, the meter placement plane 67 is orthogonal to reference line segment B.

FIG. 8 illustrates rotation angle θ2 for the speedometer dial face 61 and the tachometer dial face 62 when change angle θ at the driver's viewpoint changes to angle θ1. Rotation angle θ2 for the speedometer dial face 61 and the tachometer dial face 62 results from multiplying change angle θ1 at the driver's viewpoint and a coefficient smaller than 1. Therefore, the magnitude relationship is θ2<θ1.

FIG. 9 illustrates the road 63 and the vehicle 64 at the viewpoint position set to zero degrees. FIG. 9 illustrates a reference orientation of the speedometer dial face 61 and the tachometer dial face 62. In FIG. 9, the road 63 is parallel to reference line segment B. FIG. 10 illustrates rotation angle θ3 for the road 63 and the vehicle 64 when change angle θ at the driver's viewpoint changes to angle θ1. Rotation angle θ3 for the road 63 and the vehicle 64 results from multiplying change angle θ1 at the driver's viewpoint and a coefficient greater than 1. Therefore, the magnitude relationship is θ1<θ3.

In S7, the process generates an image of the display object 60 that is rotated in S5 and S6 and is viewed from the position of the camera 66. The generated image is provided as a display image. The position of the camera 66 is found from the driver's viewpoint position acquired in S2. The position of the illumination 65 corresponds to the sun position when the image is generated. It is necessary to provide a relationship to find an angle of the sun from the time, the traveling direction, and the current position to determine the position of the sun. The position of the illumination 65 is determined by use of the relationship, the actual time, traveling direction, and current position. A GNSS receiver detects the current position, for example. The traveling direction can be calculated from a trajectory for the current position.

When viewed from the position of the camera 66, the road 63 and the vehicle 64 may overlap with the speedometer dial face 61 or the tachometer dial face 62. Namely, the display object 60 in group A may overlap with the display object 60 in group B. In this case, a display image generated from image data in group A is generated to be always closer to the viewpoint than a display image generated from image data in group B. The generated display image is then output to the monitor 10.

The above-mentioned process, when performed, may change the driver's viewpoint position from the 0-degree direction. Then, the display image belonging to group A and the display image belonging to group B are rotationally moved from the corresponding display images displayed at the driver's viewpoint position set to zero degrees.

A rotation angle for the display image generated from image data in group B is found by multiplying change angle θ at the driver's viewpoint position by a coefficient greater than 1. A rotation angle for the display image generated from image data in group A is found by multiplying change angle θ thereof by a coefficient smaller than 1. Therefore, the rotational movement amount of the display image in group B is larger than the rotational movement amount of the display image in group A. Therefore, it is possible to provide a realistic sensation for a driver in comparison with a case where the rotational movement amount of all display images is equal to the rotational movement amount of display images in group A.

The rotational movement amount of display images in group A is smaller than the rotational movement amount of display images in group B. Group A is classified to contain image data needed to read necessary information such as image data to generate the speedometer dial face 61 and the tachometer dial face 62. Therefore, it is possible to reduce difficulty in reading the necessary information.

The present embodiment configures the meter placement plane 67 to include rotation center $C_A$ for the speedometer dial face 61 and the tachometer dial face 62 belonging to group A. Rotation center $C_B$ for the road 63 and the vehicle 64 belonging to group B is positioned ahead of rotation center $C_A$ in the virtual space 50. The road 63 and the vehicle 64 thereby cause the movement amount on the monitor 10 to be greater than a case where rotation center $C_B$ for the road 63 and the vehicle 64 is positioned on the meter placement plane 67. Therefore, it is possible to more effectively provide a realistic sensation for a driver.

The present embodiment displays a display image generated from image data in group A to be always closer to the viewpoint than a display image generated from image data in group B. Therefore, it is also possible to reduce difficulty in reading the necessary information.

Second Embodiment

A second embodiment will be described. An element marked with the same reference numeral as that used hitherto may be contained in the description of the second embodiment or later and, in such a case, is equal to the element marked with the same reference numeral described in the preceding embodiment, unless otherwise specified.

When only part of a configuration is described, the other parts of the configuration may conform to the embodiment that is already described.

Figure 11:
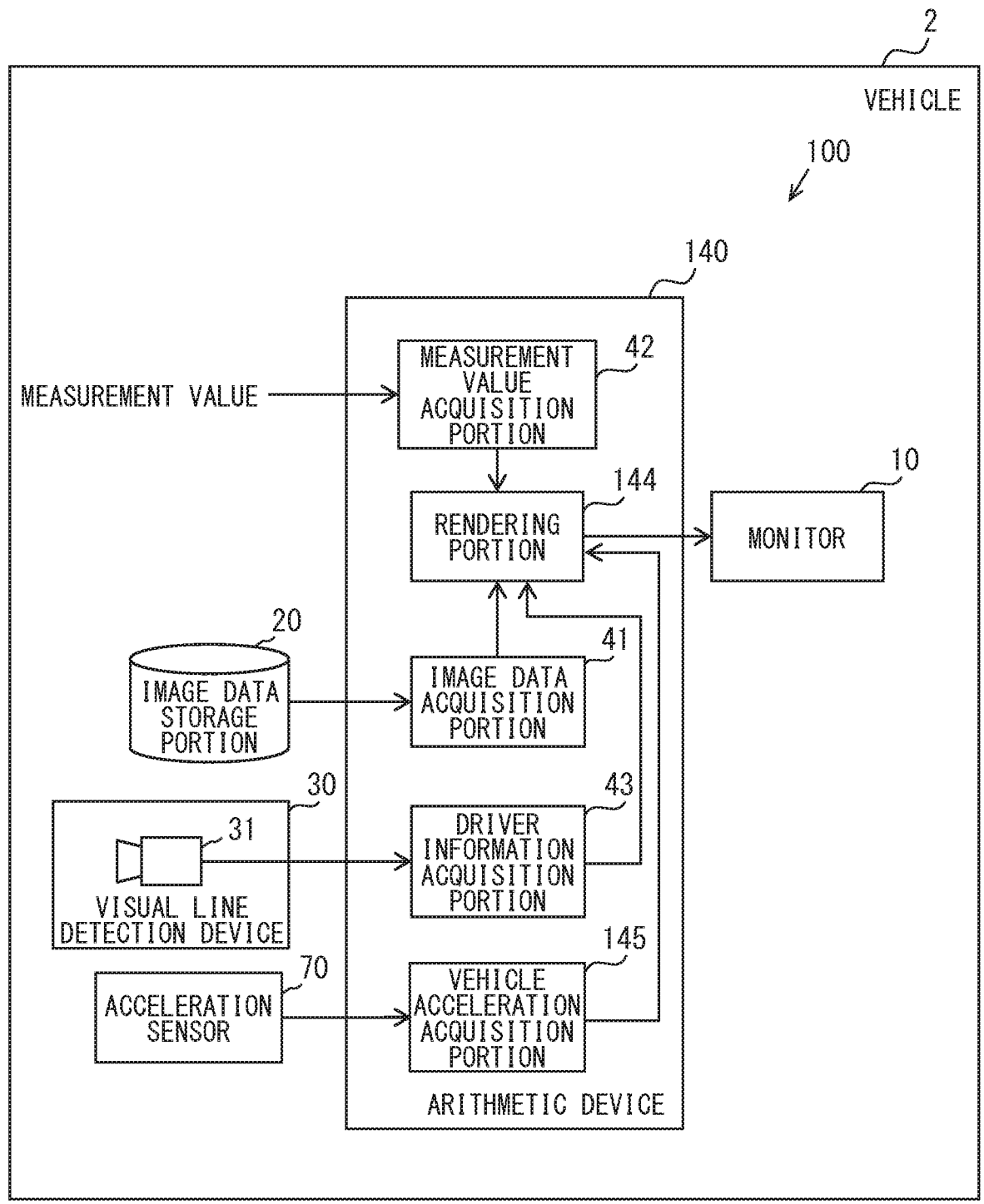
FIG. 11 is a block diagram illustrating a configuration of the vehicle display device according to a second embodiment.

FIG. 11 illustrates a configuration of a vehicle display device 100 according to the second embodiment. The vehicle display device 100 is mounted on the vehicle 2. The vehicle display device 100 includes an acceleration sensor 70. An arithmetic device 140 includes a vehicle acceleration acquisition portion 145 and a rendering portion 144 different from the first embodiment.

The acceleration sensor 70 successively detects accelerations in the left-light direction of the vehicle 2. Besides, the acceleration sensor 70 may detect accelerations in the front-back direction and the vertical direction of the vehicle 2.

The vehicle acceleration acquisition portion 145 successively acquires accelerations in the left-right direction occurring on the vehicle 2 from the acceleration sensor 70. The rendering portion 144 differs from the rendering portion 44 according to the first embodiment in that the rendering portion 144 determines a rotation angle of the display object 60 based on a horizontal acceleration of the vehicle 2 acquired by the vehicle acceleration acquisition portion 145.

Figure 12:
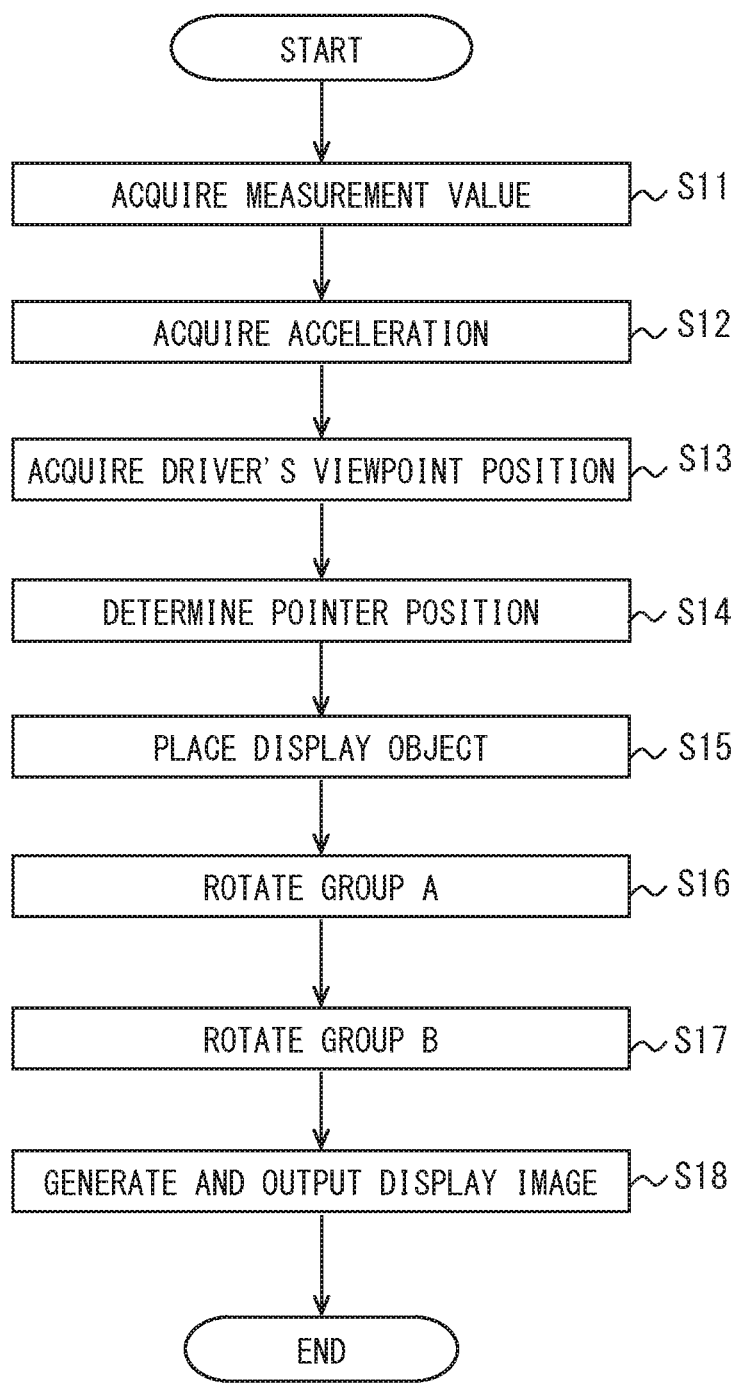
FIG. 12 is a flowchart illustrating a process performed by a rendering portion in FIG. 11.

A process of the rendering portion 144 will be described by use of a flowchart illustrated in FIG. 12. The process in FIG. 12 is performed in place of the process in FIG. 4. In FIG. 12, the measurement value acquisition portion 42 performs the process in S11 similarly to S1. The vehicle acceleration acquisition portion 145 performs the process in S12 to acquire a horizontal acceleration of the vehicle 2 from the acceleration sensor 70. The driver information acquisition portion 43 performs the process in S13 similarly to S2. The rendering portion 144 performs the process in S14 and later.

The process in S14 and S15 is similar to the process in S3 and S4 in FIG. 4. In S16, the process rotates the display object 60 represented by image data belonging to group A. Unlike the first embodiment, in S16, a rotation angle of the display object 60 belonging to group A is assumed to be change angle θ at the driver's viewpoint. Rotation center $C_A$ is equal to the first embodiment.

Since the rotation angle for the group A is determined as above, the speedometer dial face 61 and the tachometer dial face 62 can be positioned straight in front of the driver's face even if the acceleration in the left-right direction of the vehicle 2 changes the position of the driver's head 4.

Figure 13:
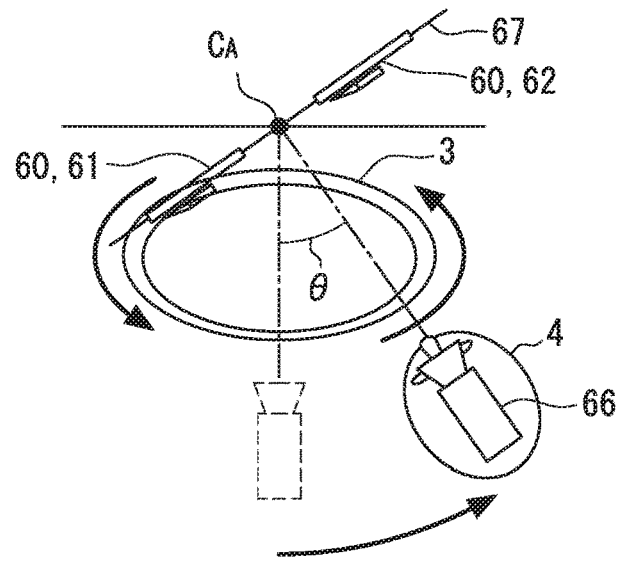
FIG. 13 is a diagram illustrating a specific process of the rendering portion.

FIG. 13 illustrates an example of the process in S16. The example in FIG. 13 assumes that a steering wheel 3 is massively moved in a short time to generate a large horizontal acceleration on the vehicle 2 and the position of the driver's head 4 therefore massively moves to the right in the drawing.

The second embodiment can position the speedometer dial face 61 and the tachometer dial face 62 straight in front of the driver's face even if the position of the driver's head 4 moves massively. Therefore, it is possible to avoid degrading the visibility of the speedometer dial face 61 and the tachometer dial face 62.

In S17, the process rotates the display object 60 represented by image data belonging to group B. The second embodiment determines a rotation angle for the display object 60 belonging to group B based on the magnitude of the acceleration acquired in S12. Specifically, experiments are conducted to predetermine the relationship between the magnitude of an acceleration in the left-right direction and change angle θ at the driver's viewpoint. The acceleration acquired in S12 and the above-mentioned relationship determine change angle θ. Change angle θ is multiplied by a coefficient greater than 1 to find the rotation angle.

The rotation angle is determined as above. The rotation angle for the display object 60 in group B is greater than an angle to be positioned straight in front of the driver's face. Also in the second embodiment, the rotational movement amount of the display object 60 in group B is greater than the rotational movement amount of the display object 60 in group A.

Figure 14:
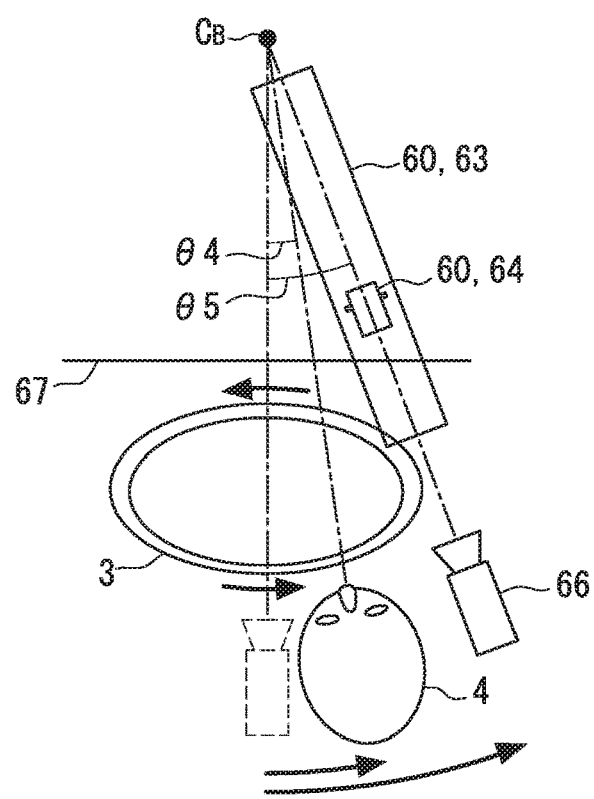
FIG. 14 is a diagram illustrating a specific process of the rendering portion.

FIG. 14 illustrates an example of the process in S17. Unlike FIG. 13, however, the steering wheel 3 is not massively moved. Therefore, the rotation of the steering wheel 3 does not generate a large horizontal acceleration on the vehicle 2. As a result, the position of the driver's head 4 does not change largely. However, the second embodiment finds the rotation angle for the display object 60 in group B by multiplying a coefficient greater than 1 by change angle θ determined by the acceleration occurring in the horizontal direction of the vehicle 2. Therefore, as illustrated in FIG. 14, rotation angle θ5 against the road 63 and the vehicle 64 is larger than change angle θ4 for the driver's face.

In S18, the process generates an image of the display object 60 that is rotated in S16 and S17 and is viewed from the position of the camera 66. The generated image is provided as a display image. The similar method to the first embodiment determines the position of the camera 66 and the position of the illumination 65. Like the first embodiment, a display image generated from image data in group A is generated to be always closer to the viewpoint than a display image generated from image data in group B. The generated display image is then output to the monitor 10.

The second embodiment determines the rotation angle for the display object 60 in group B based on the horizontal acceleration of the vehicle 2. The rotation angle for the display object 60 in group B is larger than the rotation angle for the display object 60 in group A. Therefore, it is possible to provide a realistic sensation and the drivability for a driver in comparison with a case where the rotational movement amount of all display images is equal to the rotational movement amount of display images generated from image data in group A.

More specifically, the rotation angle against the display object 60 in group B is found by multiplying a coefficient greater than 1 by change angle θ determined by the acceleration occurring in the direction in the left-light direction of the vehicle 2. As illustrated in FIG. 14, the road 63 and the vehicle 64 moves massively when the driver slightly manipulates the steering wheel 3. Therefore, the configuration can give the driver a realistic sensation.

The rotational movement amount of display images in group A is smaller than the rotational movement amount of display images in group B. The display image in group A is positioned at the rotation angle straight against the front of the driver's face even when the position of the driver's head 4 changes. Therefore, it is possible to reduce difficulty in reading the necessary information displayed on the display image in group A even when the position of the driver's head 4 changes.

(First Modification)

According to the above-mentioned embodiments, the rendering portions 44 and 144 rotationally move the display object 60. However, the display object 60 may be moved linearly in the front-back direction other than rotationally.

When the display object 60 is moved linearly in the front-back direction, the movement amount may be determined based on a driver's viewpoint-related part. In this case, the display object 60 is moved back and forth in the virtual space 50 based on the amount of change in the position of the viewpoint-related part in the front-back direction of the vehicle. It is necessary to predetermine the correspondence between the amount of change in the position of the viewpoint-related part in the front-back direction of the vehicle and the movement amount in the front-back direction of the display object 60.

When the display object 60 is moved linearly in the front-back direction, the movement amount may be determined based on a front-back acceleration occurring on the vehicle 2. In this case, the display object 60 is moved back and forth in the virtual space 50 based on the front-back acceleration occurring on the vehicle 2. It is necessary to predetermine the correspondence between a front-back acceleration occurring on the vehicle 2 and the movement amount in the front-back direction of the display object 60.

(Second Modification)

The first embodiment determines the rotation angle based on the driver's viewpoint position. However, the rotation angle may be determined based on the position of the head 4 instead of the viewpoint position. This is because the head 4 moves along with the viewpoint. The position of the head 4 provides an example of the viewpoint-related part.

(Third Modification)

The rotation angle may be determined by use of the visual line direction instead of the viewpoint position. As above, the reference point and the moving point of the eye are detected to detect the visual line direction. Therefore, the viewpoint position is also detected when the visual line direction is used to detect the rotation angle. When the visual line is used, the rotation angle for the display object 60 is determined based on an angle change amount of the visual line.

(Fourth Modification)

The above-mentioned embodiments classify the display object 60 into group A and group B. Besides, group C may be configured. Group C contains an object that does not move despite a change in the position of the viewpoint-related part or a change in the acceleration occurring on the vehicle.

For example, group C can include an image to provide the driver with information displayed on the monitor 10 based on a condition of turning on or off the light. Specifically, group C can include an indicator such as a seat belt reminder. In another respect, group C can include an image that is displayed at corners or outer edges of the monitor 10. Originally, these positions provide the driver with less visibility and, if moved, unfavorably degrade the visibility. The positions, if moved, unsuccessfully give a realistic sensation to the driver.

(Fifth Modification)

The first embodiment may multiply coefficient 0 by change angle θ at the driver's viewpoint position in terms of the display object 60 in group A. Namely, in the first embodiment, group A may not be moved even if the position of the viewpoint-related part changes. The second embodiment may also set the movement amount of group A to 0 regardless of an acceleration occurring on the vehicle.

(Sixth Modification)

Images displayed on the vehicle display device may not include instruments such as the speedometer dial face 61 and the tachometer dial face 62. For example, the vehicle display device may be embodied as a navigation system.

(Seventh Modification)

A yaw angle acceleration may be detected as a horizontal acceleration of the vehicle 2. The yaw angle can be acquired by differentiating a yaw rate detected by a yaw rate sensor, for example.

(Eighth Modification)

The above-mentioned embodiments use the road 63 as the display object 60 belonging to group B. The road 63 is shaped to be deeper or longer in the front-back direction than the display object 60 belonging to group A. The deeply shaped display object 60 can effectively provide the driver with the realistic sensation or the drivability by placing rotation center $C_B$ ahead. The deeply shaped display object 60 is not limited to the road 63. The display object 60 may include a river, for example.

(Ninth Modification)

The second embodiment may use the similar method to the first embodiment to determine one of the rotation angle for group A and the rotation angle for group B.

(Tenth Modification)

The first and second embodiments configure rotation center $C_A$ to rotationally move group A on the meter placement plane 67, namely, the plane that includes the speedometer dial face 61 and the tachometer dial face 62 as the display objects 60 in group A. However, rotation center $C_A$ may be placed ahead of the display object 60 in group A. In other words, the display object 60 in group A may be placed farther from rotation center $C_A$.

Figure 15:
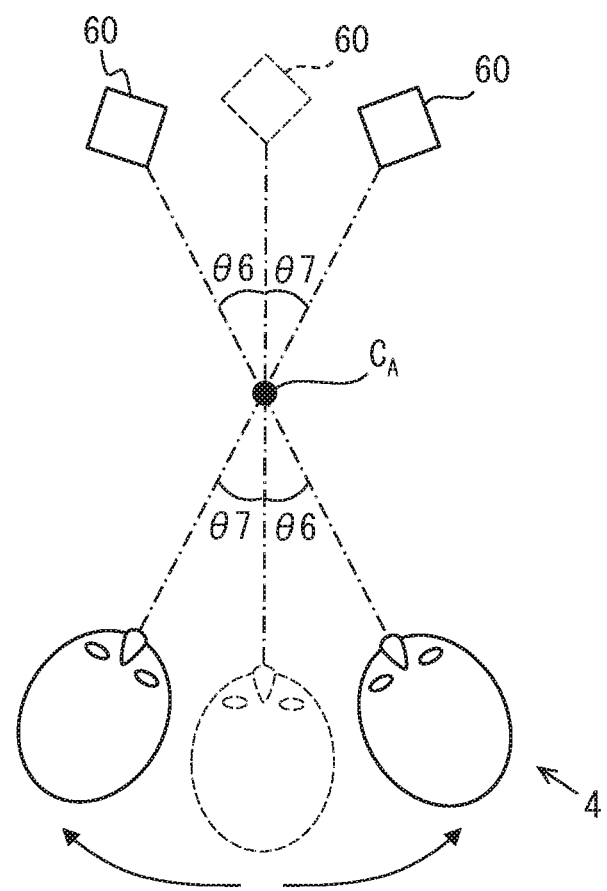
FIG. 15 is a diagram illustrating a display object placed ahead of rotation center $C_A$.

FIG. 15 illustrates an example in which rotation center $C_A$ is placed between the driver and the display object 60. According to the example in FIG. 15, the display object 60 in group A is rotated by angle θ6 around $C_A$ as the rotation center when change angle θ at the driver's viewpoint is θ6. The display object 60 in group A is rotated by angle θ7 around $C_A$ as the rotation center when change angle θ at the driver's viewpoint is θ7. Therefore, the example in FIG. 15 positions the display object 60 straight in front of the driver's face even when the position of the driver's head 4 changes.

When the display object 60 in group A is rotated by angle θ6 or θ7, the rotational movement amount of the display object 60 in group B corresponds to an angle resulting from multiplying angle θ6 or θ7 by a coefficient greater than 1. Like rotation center $C_A$ for group A, rotation center $C_B$ for group B can also be placed between the driver and the display object 60 in group B.

(Eleventh Modification)

Figure 16:
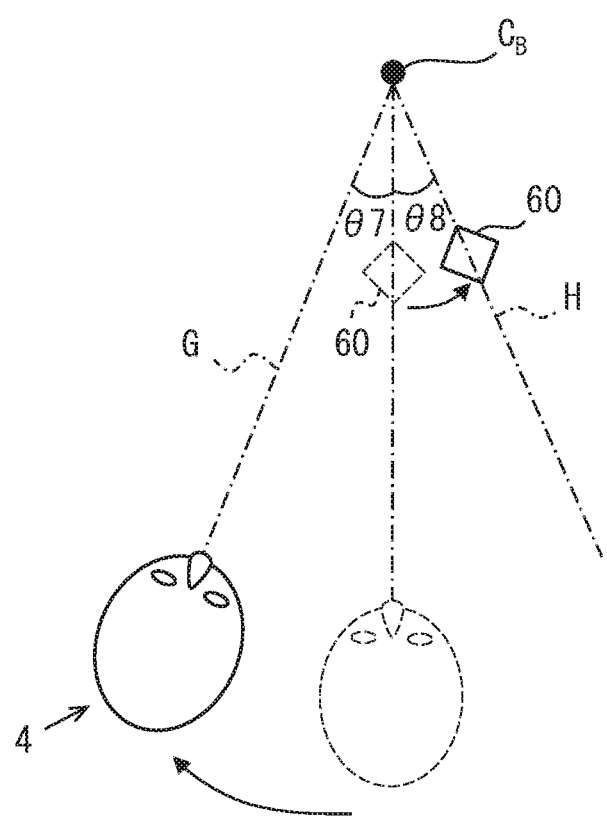
FIG. 16 is a diagram illustrating a display object rotationally moved in a direction opposite the direction of moving a head.

The first embodiment moves group A and group B in the direction of changing the viewpoint-related part. However, group B may be moved in a direction opposite the direction of changing the viewpoint-related part. FIG. 16 illustrates an example of moving the display object 60 in a direction opposite the direction of changing the driver's viewpoint. The display object 60 is rotationally moved around $C_B$ as the rotation center.

In FIG. 16, the display object 60 is assumed to belong to group B.

In the eleventh modification, the movement amount of a display image corresponds to the change amount of an angle between line segment G similar to the first embodiment and line segment H extending from the display object 60 to rotation center $C_B$. A broken line illustrates a state before the movement. In this state, line segment G and line segment H form an angle equal to 0. A solid line illustrates a state after the head moves. In this state, line segment G and line segment H form an angle equal to θ7+θ8. Therefore, the change amount of the angle is also equal to θ7+θ8.

The eleventh modification can calculate the rotational movement amount of the display object 60 in group A by using the calculation method hitherto described in the embodiments and the modifications. The eleventh modification can find the rotational movement amount of the display object 60 in group A by multiplying a positive coefficient smaller than 1 by change angle θ7 at the driver's viewpoint. It is also possible to prevent the display object 60 in group A from moving regardless of a change angle at the driver's viewpoint. In any case, the rotational movement amount of a display image in group B is larger than the rotational movement amount of a display image in group A.

(Twelfth Modification)

The eleventh modification has described that the display object 60 in group B is rotationally moved in a direction opposite the direction of changing the viewpoint-related part. The second embodiment has described that the display object 60 in group B is rotationally moved based on the acceleration in the left-right direction of the vehicle 2. The acceleration in the left-right direction, when occurring on the vehicle 2, changes the position of the viewpoint-related part. Therefore, a display object in group B may be moved in a direction opposite the acceleration in the left-right direction of the vehicle 2. FIG. 16 described above can also be regarded as providing an example of moving the display object 60 in group B in a direction opposite the acceleration in the left-right direction of the vehicle 2.

According to the twelfth modification, the movement amount of the display image is equal to the amount of changing the angle between line segment G and line segment H. The twelfth modification can calculate the rotational movement amount of the display object 60 in group A by using the calculation method described in the second embodiment and the modifications. In the twelfth modification, for example, the rotational movement amount of the display object 60 in group A may be directed to the acceleration in the left-right direction of the vehicle 2, and set to be equal to or smaller than a change angle of the driver's viewpoint that is capable of being estimated from the acceleration in the left-right direction of the vehicle 2. It is also possible to prevent the display object 60 in group A from moving regardless of a horizontal acceleration of the vehicle 2. In any case, the rotational movement amount of a display image in group B is larger than the rotational movement amount of a display image in group A.

(Thirteenth Modification)

There have been described the rotational movement and the linear movement in the front-back direction as the movement modes of the display object 60. Besides, it is possible to use horizontal slide movement in place of the rotational movement as the mode of moving the display object 60. As seen from FIGS. 15 and 16, the display object 60 viewed from the driver moves horizontally when rotation center C is positioned ahead of or behind the display object 60 viewed from the driver. Therefore, the horizontal slide movement can replace the rotational movement.

(Fourteenth Modification)

The driver viewing the monitor 10 can be provided with realistic images since display images are categorized into groups A and B and display positions of the display images are moved depending on the amount of changing viewpoint-related part positions. However, there may be a driver who does not prefer realistic images. Therefore, it may be favorable to allow a user to choose whether to perform the process that moves display images depending on the amount of changing viewpoint-related part positions.

Users may have different preferences for the movement amount of groups A and B. Therefore, it may be favorable to allow a user to configure the movement amount of groups A and B corresponding to the amount of changing viewpoint-related part positions on a group basis or in groups A and B together.

Third Embodiment

Figure 17:
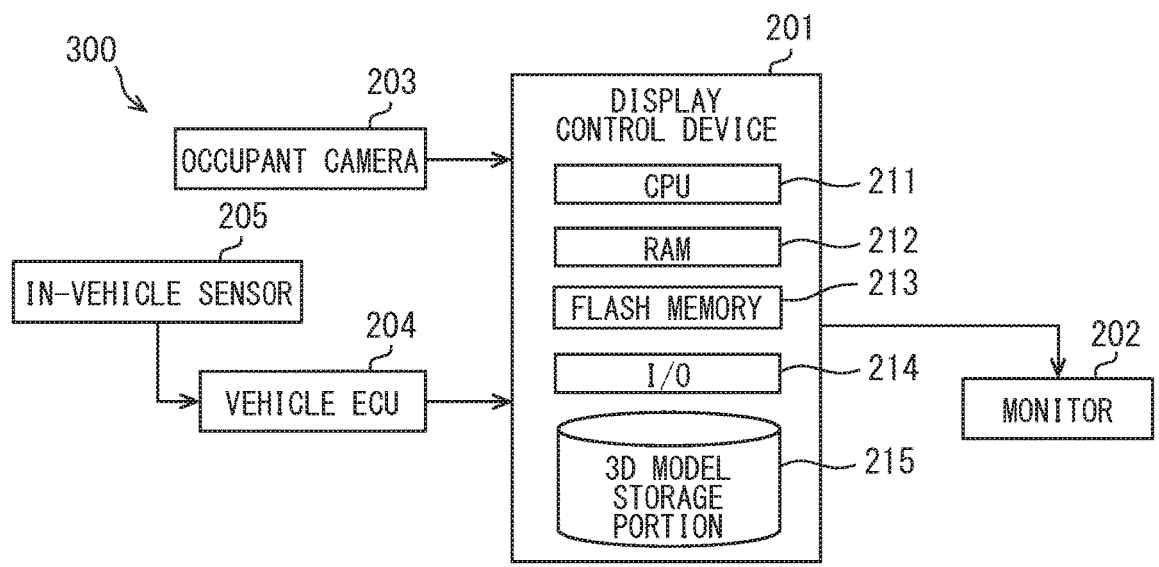
FIG. 17 is a block diagram illustrating a schematic configuration of a vehicle display system.

An embodiment of the present disclosure will be described by use of the accompanying drawings. FIG. 17 is a diagram illustrating a schematic configuration of a vehicle display system 300 according to the present embodiment. As illustrated in FIG. 17, the vehicle display system 300 includes a display control device 201, a monitor 202, an occupant camera 203, and a vehicle ECU 204. The ECU is an abbreviation for Electronic Control Unit.

The occupant camera 203 and the vehicle ECU 204 are each connected with the display control device 201 to be capable of intercommunication via a communication network (hereinafter referred to as an in-vehicle network) created in the vehicle. The monitor 202 and the display control device 201 are connected to be capable of intercommunication via the in-vehicle network or a dedicated line for video signals.

The following description uses the term "subject vehicle" to refer to a vehicle that uses the vehicle display system 300. The present embodiment assumes the subject vehicle to be a vehicle that uses an engine as a driving source. Besides, the subject vehicle may use only a motor as the driving source (to be embodied as a so-called electric vehicle) or may use an engine and a motor as the driving source (to be embodied as a so-called hybrid car).

Schematically, the display control device 201 uses three-dimensional computer graphics to render an image of an analog instrument (hereinafter referred to as an analog meter) showing information about travel control over the vehicle (hereinafter referred to as vehicle information) and displays the image on the monitor 202. The instrument showing the vehicle information includes a tachometer indicating the engine speed and a speedometer indicating the vehicle speed, for example. The analog meter indicates a numeric value for the state amount (such as vehicle speed) to be displayed by using a pointer and a scale face as actual entities. The display control device 201 displays an instrument image simulating the above-mentioned analog meter.

Figure 18:
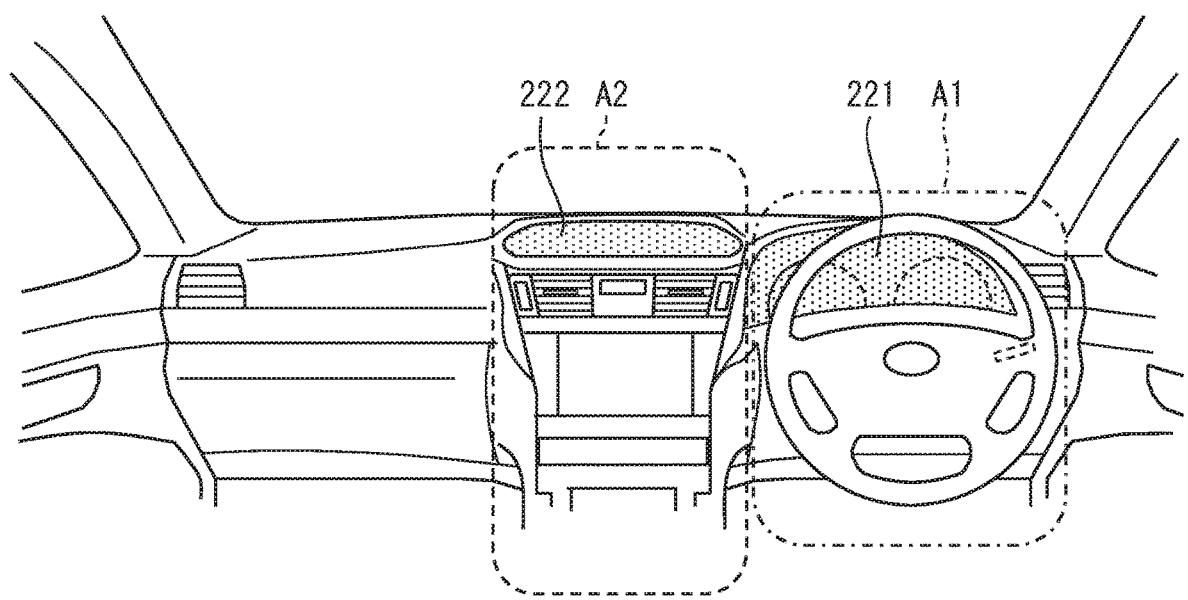
FIG. 18 is a diagram illustrating a monitor to be controlled by the display control device.

The monitor 202 displays an imaged input from the display control device 201. According to the present embodiment, as illustrated in FIG. 18 as an example, the monitor 202 is provided as a monitor (so-called meter-monitor) 221 placed in region A1 of an instrument panel in front of the driver's seat. The monitor 202 is capable of full-color display and can be embodied as a liquid crystal display, an organic EL display, or a plasma display.

As another mode, the monitor 202 may be mounted on a position other than the above-mentioned position. The monitor 202 may be provided as a monitor (so-called center monitor) 222 provided at the top of a center portion (hereinafter referred to as center region) A2 in the vehicle width direction of the instrument panel, for example. The monitor 202 may principally display a navigation screen and may be placed beside a steering column cover in center region A2. The monitor 202 may be provided as a head-up display that displays a virtual image on part of a windshield ahead of the driver's seat.

Figure 19:
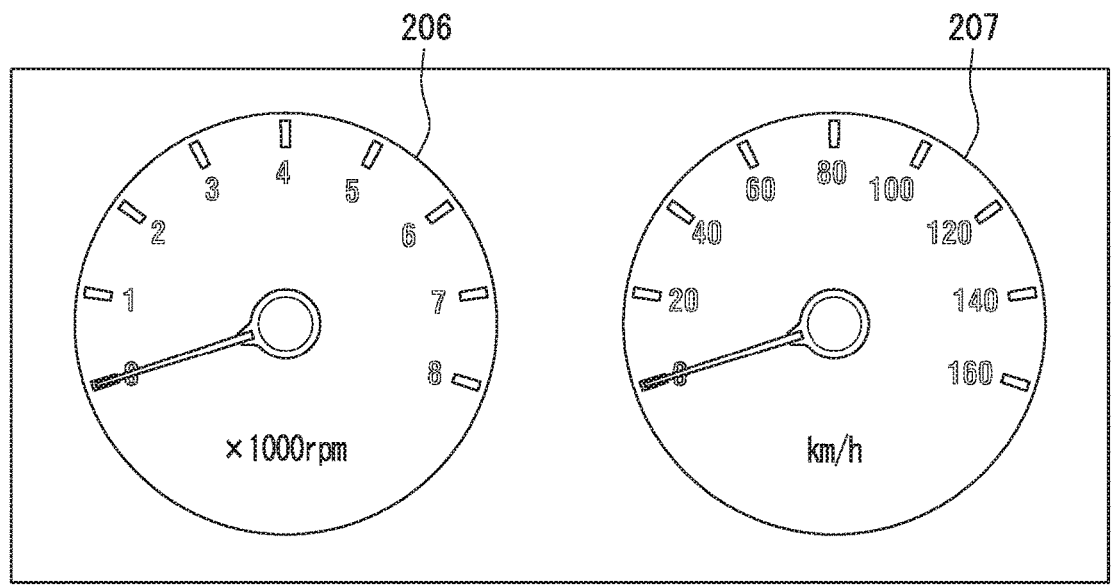
FIG. 19 is a diagram illustrating a meter unit image displayed on the monitor.

The display control device 201 displays the above-mentioned instrument image such as a tachometer image 206 indicating the current engine speed and a speedometer image 207 indicating the current vehicle speed as illustrated in FIG. 19. The tachometer image 206 simulates an analog tachometer representing the current engine speed by rotating a pointer over an approximately circular scale face arcuately provided with scales and numeric values corresponding to the engine speed detected by a sensor. The speedometer image 207 simulates an analog speedometer representing the current vehicle speed by rotating a pointer over an approximately circular scale face arcuately provided with scales and numeric values corresponding to the vehicle speed detected by a vehicle speed sensor.

The instrument image corresponds to vehicle information such as the engine speed or the vehicle speed. The instrument image is positioned on a predetermined layout and is displayed on the monitor 202. An image finally displayed on the monitor 202 is also referred to as a meter unit image for convenience sake.

The description below selects the speedometer and the tachometer as illustrative instruments to be displayed by the display control device 201. The description below explains a case in which the monitor 202 displays images including these two instrument images as the final meter unit image. Specifically, the following explains the mode of rendering the meter unit image, namely, the image including both the tachometer image 206 and the speedometer image 207.

It may be favorable to appropriately design types, combinations, or the number of instruments to be displayed by the display control device 201. Types of instruments to be displayed may be dynamically changed depending on states of the vehicle such as traveling in process. Only the tachometer or the speedometer may be displayed as the instrument to be displayed. It may be favorable to display an image containing other types of the vehicle information (such as shift positions). Instruments to be displayed may include a fuel gauge representing the remaining fuel by using a pointer and a scale or a water temperature gauge representing the temperature of cooling water to cool the engine. The instrument image may be rendered as an image simulating the fuel gauge or the water temperature gauge. The subject vehicle may be an electric vehicle or a hybrid car that uses a motor as the driving source, for example. In such a case, instruments to be displayed may include a battery indicator that indicates the remaining battery level mainly by using a pointer.

The display control device 201 is configured as a computer. The display control device 201 includes a CPU 211 to execute various types of arithmetic processing, RAM 212, flash memory 213, an I/O 214, a 3D model storage portion 215, and a bus line to connect these components.

The CPU 211 is configured to execute various types of arithmetic processing and may be embodied by using a microprocessor, for example. The display control device 201 may replace the CPU 211 with MPU or GPU. The RAM 212 is provided as the volatile memory. The flash memory 213 is provided as the non-volatile memory.

The flash memory 213 mainly stores a program (hereinafter referred to as a display control process) that allows an ordinary computer to function as the display control device 201. The above-mentioned display control process just needs to be stored in a tangible storage medium (non-transitory tangible storage medium). Execution of the display control process on the CPU 211 corresponds to the execution of a method corresponding to the display control process. The CPU 211 executes the display control process and thereby the display control device 201 provides various functions. Various functions included in the display control device 201 will be described later.

The I/O 214 is provided as an interface that allows the display control device 201 to input or output data from an external device (such as the vehicle ECU 204). The I/O 214 may be embodied mainly by using an IC, a digital circuit element, or an analog circuit element.

The 3D model storage portion 215 is provided as a storage device that stores data used to render an instrument image. The 3D model storage portion 215 is embodied by using a non-volatile storage medium. The data used to render an instrument image represents a three-dimensional shape on a part basis to generate a 3D model of the instrument such as the tachometer or the speedometer displayed on the monitor 202. The data representing a three-dimensional shape also signifies data representing a three-dimensional model (3D model).

Figure 20:
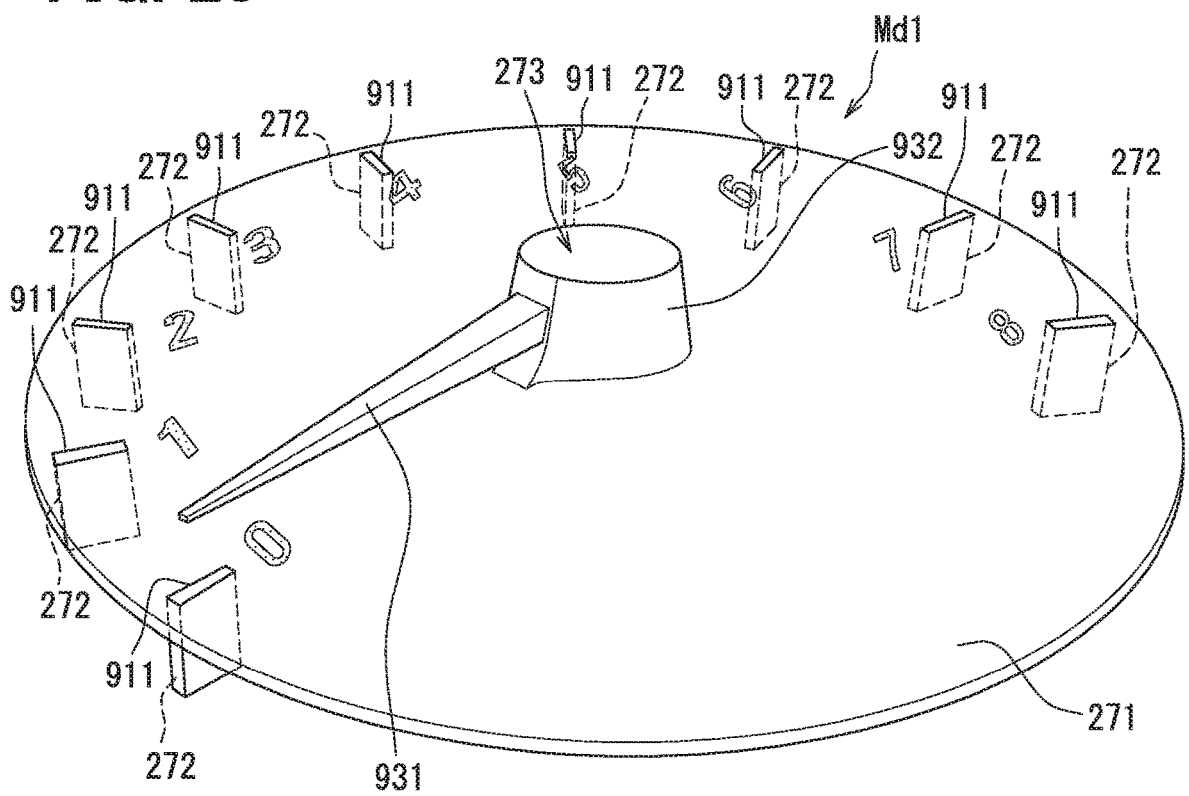
FIG. 20 is a diagram illustrating parts configuring a 3D model of an instrument.

More specifically, as illustrated in FIG. 20, the 3D model storage portion 215 stores a base plate object 271, a plurality of scale objects 272, and a pointer object 273 as stereoscopic data for each part of tachometer model Md1 as a 3D model of the tachometer.

The base plate object 271 provides data representing a stereoscopic model of a base plate comparable to a plate-like member representing an outer shape of the tachometer scale face. In other words, the base plate object 271 is provided as a member that provides a background corresponding to a range in which the pointer rotates. The base plate object 271 is schematically shaped so that scales are die-cut into the scale face. A hole (hereinafter referred to as a scale hole) 911 corresponding to the scale is die-cut into the base plate object 271. A character (such as an integer ranging from 0 to 8) corresponding to the scale hole 911 is attached close to the scale hole 911.

The present embodiment provides an example in which the tachometer includes nine scales corresponding to integers 0 to 8 and accordingly includes nine scale holes 911 corresponding to the nine numeric characters 0 to 8. The tachometer indicates an engine speed by multiplying a numeric value corresponding to the scale by 1000. Namely, the engine speed is represented by n×1000 [rpm], where n denotes any numeric value (n=0 to 8) attached to each scale.

In this example, the base plate object 271 integrally includes a character representing the numeric value corresponding to each scale as a surface design of the base plate object 271, but not limited thereto. The 3D model storage portion 215 may store a character representing the numeric value as an object (hereinafter referred to as a character object) independent of the base plate object 271.

The scale object 272 is provided as a stereoscopic model of the tachometer scale. The present embodiment provides an example of using nine scale objects 272 corresponding to numeric characters 0 to 8. Each scale object 272 is combined with the scale hole 911 of the base plate object 271 to form a stereoscopic model (or a scale face object) for the scale face.

The pointer object 273 provides data representing the stereoscopic model of a pointer member. The pointer object 273 includes a pointer body portion 931 as a pointer body and a rotation axis portion 932 that is joined to the base plate object 271 and provides a rotation axis of the pointer body portion 931.

There has been described in detail the stereoscopic data for each part of tachometer model Md1. The same applies to stereoscopic data for each part of speedometer model Md2 as a 3D model of the speedometer. The description below uses similar reference numerals for parts of speedometer model Md2 and parts of tachometer model Md1 for convenience sake. Namely, the 3D model storage portion 215 stores the base plate object 271, a plurality of the scale objects 272, and the pointer object 273 as stereoscopic data for each part of speedometer model Md2.

There may be provided a plurality of patterns of stereoscopic data for each instrument. The patterns of stereoscopic data may be selectively used based on display screen layouts, vehicle states, or user options, for example. Besides, the 3D model storage portion 215 also stores data (or design skin data) representing design skins to change colors or textures for each part of the instruments.

The occupant camera 203 is installed to capture the face of an occupant sitting on a driver's seat (hereinafter referred to as a driver). For example, the occupant camera 203 is placed so that the center (so-called optical axis) of a capturing direction is directed toward the presence of an eyelips provided for the subject vehicle. The eyelips provides a predetermined region based on an eye range that statistically represents the distribution of driver's eye points (see JISD0021:1997 for details). The occupant camera 203 may be placed to capture the driver's face region at an appropriately designed position such as a steering column cover, part of an instrument panel opposite the driver's seat, or close to an inside rearview mirror.

The occupant camera 203 is embodied by using a near-infrared light source, a near-infrared camera, and a control unit to control the components. The occupant camera 203 detects the position of the driver's head or the direction of the driver's face by applying a known image recognition process to the image captured by the near-infrared camera. The present embodiment also successively detects the eye position. The occupant camera 203 successively outputs visual line origin point information to the display control device 201. The visual line origin point information mainly represents the driver's head position, face orientation, and eye position specified from the captured image. The position of the head or eye can be expressed in coordinates of a three-dimensional coordinate system provided for the vehicle. The driver's head position or eye position functions as information indicating the direction along which the driver's eye exists when viewed from the monitor 202. The driver's head position or eye position is comparable to information indicating an origin point (or a starting point) of the visual line directed to the monitor 202.

The occupant camera 203 may provide a capturing range to cover not only the driver's face but also the upper body. The occupant camera 203 is not limited to an infrared camera and may be available as an optical camera. The occupant camera 203 may be embodied by using known imaging devices such as CCD and CMOS. The occupant camera 203 corresponds to a visual line origin point detection device. The visual line origin point detection device may estimate position of the driver's head by transmitting and receiving search waves such as ultrasonic waves or millimeter waves.

The vehicle ECU 204 acquires information (vehicle information) about vehicle states needed for driving manipulations from various sensors (hereinafter referred to as in-vehicle sensors) 205 mounted on the subject vehicle. The vehicle ECU 204 acquires the vehicle information such as traveling speed of the subject vehicle, engine speed, remaining fuel, temperature of engine cooling water, distance traveled by the vehicle, shift position, and position of a turn signal lever. The vehicle information also includes the seat-belt use, the state of lights turned on, and information to notify the driver of abnormal states occurring on a driving system such as an engine.

The in-vehicle sensor 205 includes a sensor to detect the engine speed, a vehicle speed sensor, a sensor to detect the remaining fuel, a water temperature gauge to detect the temperature of cooling water to cool the engine, and a shift position sensor, for example. Respective information belonging to the above-mentioned vehicle information can also be referred to as element information. The vehicle ECU 204 successively outputs the above-mentioned various types of the vehicle information to the display control device 201.

(Functions of the Display Control Device 201)

Figure 21:
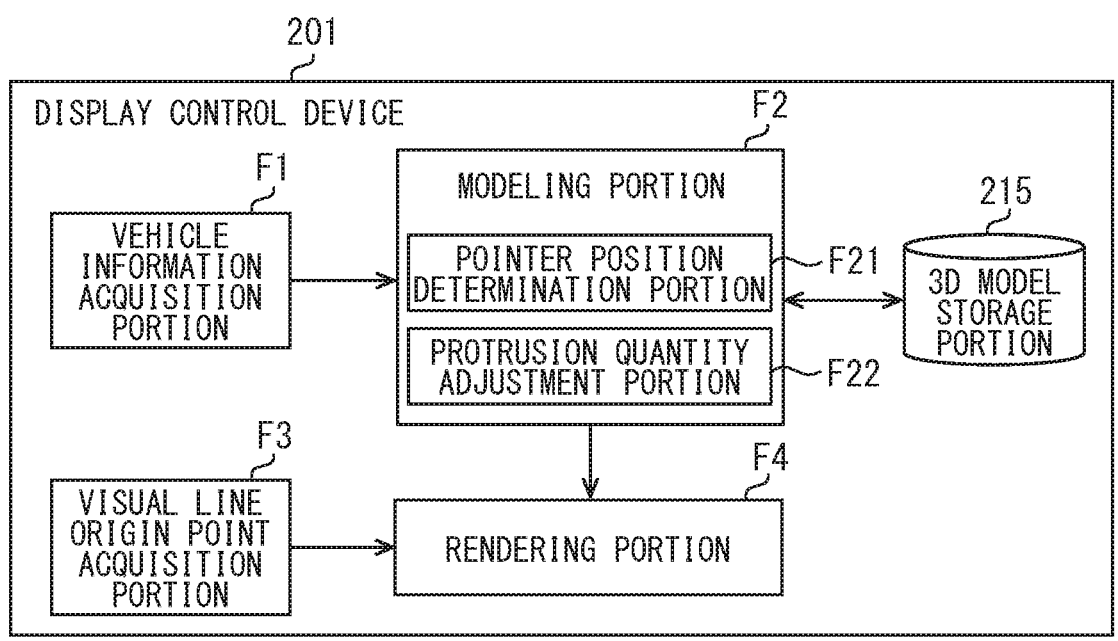
FIG. 21 is a block diagram illustrating a schematic configuration of the display control device.

The description below explains the functions of the display control device 201 by using FIG. 21. The display control device 201 provides functions corresponding to various function blocks as illustrated in FIG. 21 by allowing the CPU 211 to execute the above-mentioned display control process. The display control device 201 includes the function blocks such as a vehicle information acquisition portion F1, a modeling portion F2, a visual line origin point acquisition portion F3, and a rendering portion F4.

All or part of the function blocks included in the display control device 201 may be embodied as hardware. The mode of the embodiment using the hardware includes a mode of the embodiment using one or more ICs. All or part of the function blocks included in the display control device 201 may be embodied by a combination of execution of the software on the CPU 211 and hardware members.

The vehicle information acquisition portion F1 acquires various types of vehicle information from the vehicle ECU 204 and successively supplies the vehicle information to the modeling portion F2. For example, the vehicle information acquisition portion F1 successively acquires the current vehicle speed or engine speed and supplies it to the modeling portion F2.

The modeling portion F2 represents a three-dimensional shape of each instrument to be displayed in the virtual 3D space based on 3D shape data stored in the 3D model storage portion 215. The modeling portion F2 generates tachometer model Md1 and speedometer model Md2. The modeling portion F2 corresponds to a stereoscopic instrument model generation portion. For convenience sake, a modeling process denotes a process that generates 3D models for various instruments based on the 3D shape data stored in the 3D model storage portion 215. The stereoscopic model for each instrument is embodied by defining 3D coordinates corresponding to vertexes for each part and a connection therebetween.

Schematically, the modeling portion F2 generates a scale face object by placing (specifically, engaging or inserting) the scale object 272 in each scale hole 911 provided for the base plate object 271. The rotation axis portion 932 is placed so that its bottom is in contact with a specified position (such as the center) of the scale face object, thereby constructing a 3D model (hereinafter referred to as a stereoscopic instrument model) for the instrument to be displayed.

Figure 22:
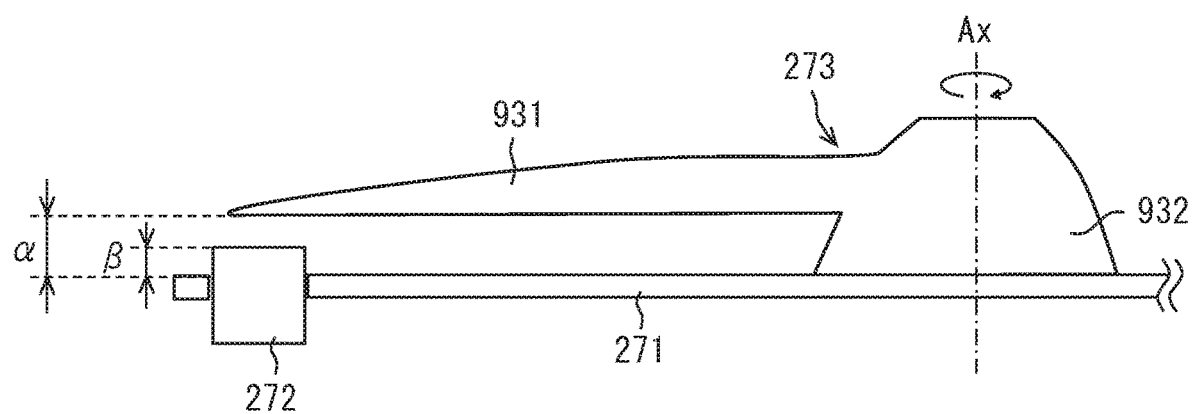
FIG. 22 is a diagram illustrating a positional relationship among parts configuring a stereoscopic instrument model.

As illustrated in FIG. 22, the pointer object 273 is combined with the 3D model of the instrument and rotates (or moves) within a plane apart from the surface of the base plate object 271 by separation distance $\alpha$. The rotation axis portion 932 included in the pointer object 273 provides separation distance $\alpha$. A specific value of separation distance $\alpha$ can be appropriately designed. The present example assumes separation distance $\alpha$ to be 4 mm. Separation distance α may be set to 2 mm, 10 mm, or any other values. Axis Ax in FIG. 22 represents the rotation axis of the pointer object 273.

The scale object 272 is generally placed so that its tip coincides with the surface of the base plate object 271. A protrusion amount adjustment portion F22 (to be described) determines the position of the scale object 272 concerning the surface (hereinafter referred to as a base plate surface) of the base plate object 271, specifically, the amount of protrusion (hereinafter referred to as a protrusion amount) β applicable to the tip of the scale object protruding from the base plate surface.

The mode of setting protrusion amount β to 0 corresponds to a mode of placing the scale object 272 so that its tip coincides with the base plate surface. The base plate surface is one of two surfaces of the base plate object 271 and allows the pointer object 273 to be placed. The coincidence in this example is not limited to complete coincidence. The coincidence includes a mode of allowing the tip of the scale object 272 to negligibly protrude from the base plate surface.

The modeling portion F2 includes a pointer position determination portion F21 and a protrusion amount adjustment portion F22 as sub-functions to perform the abovementioned modeling process. The pointer position determination portion F21 determines the position of the pointer against the base plate object 271 as a stereoscopic model of the instrument to be displayed. Specifically, the pointer position determination portion F21 determines the position (more specifically, a rotation angle) of the pointer object 273 against the base plate object 271 of the tachometer based on an engine speed supplied from the vehicle information acquisition portion F1 so that the pointer object 273 indicates the current engine speed. The pointer position determination portion F21 determines the position of the pointer object 273 against the base plate object 271 of the speedometer based on a vehicle speed supplied from the vehicle information acquisition portion F1 so that the pointer object 273 indicates the current vehicle speed. The position of the pointer object 273 determined by the pointer position determination portion F21 is comparable to the position indicating the current state (specifically, a numeric value) of the vehicle information to be displayed.

The protrusion amount adjustment portion F22 determines protrusion amount β of each scale object 272 based on the pointer position determined by the pointer position determination portion F21. Protrusion amount β of one of the scale objects 272 signifies the amount of protrusion applicable to the tip of the scale object 272 protruding from the surface (base plate surface) of the base plate object 271.

The protrusion amount adjustment portion F22 determines protrusion amount β according to indicated value distance D as a difference (conceptually, a distance) between a numeric value associated with each scale object 272 and a numeric value indicated by the pointer. Specifically, protrusion amount β is set to a large value for the scale object 272 that is associated with a value approximate to the value indicated by the pointer object 273. In other words, the scale object 72 at a position close to the position indicated by a pointer 73 is given protrusion amount β set to a value relatively greater than that for the scale object 72 at a position distant from the position indicated by the pointer 73. Protrusion amount β can be dynamically set to a range of values equal to or greater than 0 and equal to or smaller than a. When the tachometer pointer indicates "3," for example, indicated value distance D set to 1 (strictly, 1×1000 rpm) applies to the scale objects 272 associated with "2" and "4" on the scale face. When the tachometer pointer indicates "3," indicated value distance D set to 2 (strictly, 2×1000 rpm) applies to the scale objects 272 associated with "1" and "5" on the scale face.

Figure 23:
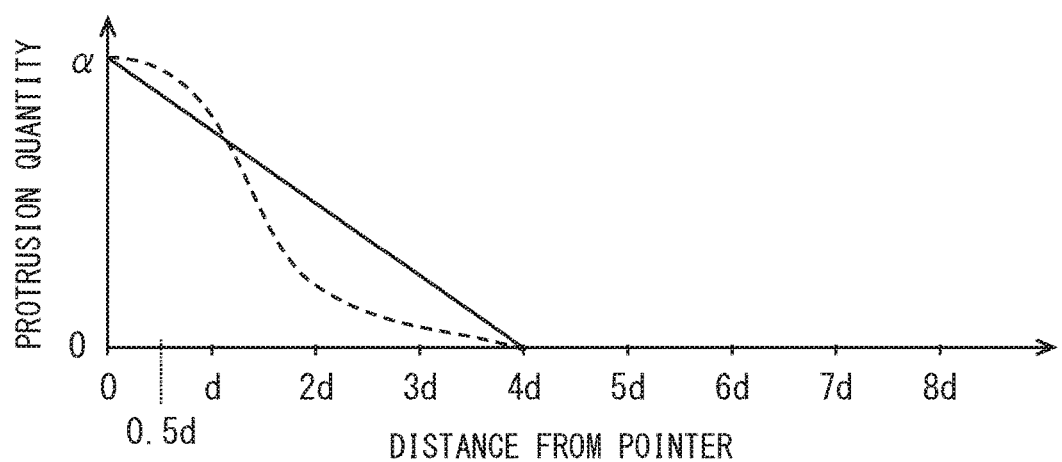
FIG. 23 is a diagram illustrating a correspondence relationship between distance of a scale object from a pointer object and protrusion amount of the scale object.

As illustrated by a solid line in FIG. 23, for example, the protrusion amount adjustment portion F22 may decrease protrusion amount β like a direct function (or linearly) concerning indicated value distance D. As illustrated by a broken line in FIG. 23, for example, the protrusion amount adjustment portion F22 may decrease protrusion amount β like a curved line concerning indicated value distance D. In FIG. 23, the vertical axis represents protrusion amount β and the horizontal axis represents indicated value distance D. Value d plotted on the horizontal axis represents a numeric value corresponding to one scale. For example, numeric value 1000 [rpm] is assigned to one scale of the tachometer according to the present embodiment. Numeric value 20 [km/h] is assigned to one scale of the speedometer according to the present embodiment.

The example of FIG. 23 represented by the solid line and the broken line provides a control mode in which protrusion amount β is set to a as the maximum value for the scale object 272 provided with indicated value distance D set to 0, namely, the scale object 272 corresponding to the numeric value indicated by the pointer object 273. Besides, FIG. 23 provides a control mode in which protrusion amount β is set to 0 as the minimum value for the scale object 272 corresponding to a numeric value causing indicated value distance D to make four scales or more.

The maximum value of protrusion amount β need not be set to a but may be set to 0.7α, 0.5α, or 0.3α, for example. As will be described in detail later, a value greater than 0 suppresses positional misalignment between the pointer and the scale in the display image, making it possible to improve the visibility of the vehicle information. The minimum value of protrusion amount β need not be set to 0 but may be set to 0.1α, 0.3α, or 0.5α, for example.

The modeling portion F2 places the pointer object 273 at the center of the base plate object 271 so as to indicate a rotation angle determined by the pointer position determination portion F21. Besides, the modeling portion F2 constructs a stereoscopic instrument model by placing each scale object 272 to protrude from the base plate surface by protrusion amount β determined by the protrusion amount adjustment portion F22. The configuration to place the pointer object 273 at a position determined by the pointer position determination portion F21 is comparable to a configuration to place the pointer object 273 at a position indicating a specified state.

When generating 3D models for all the instruments to be displayed, the modeling portion F2 generates a meter unit object 275 including the 3D models placed on a plate-like object (hereinafter referred to as a base object) 274 based on a specified layout. The 3D models for all the instruments to be displayed include tachometer model Md1 as a 3D model of the tachometer and speedometer model Md2 as a 3D model of the speedometer.

The base object 274 functions as a base to mount the stereoscopic instrument model and provides a member comparable to the display surface of the monitor 202 in the virtual 3D space, for example. The base object 274 may include a region where no stereoscopic instrument model is placed. This region functions as a background for the meter unit image. The meter unit object 275 generated by the modeling portion F2 is supplied to the rendering portion F4.

As another mode, the base object 274 may be placed in a forward side by a specified distance (such as a length of 2 cm) from the display surface of the monitor 202 in the virtual 3D space. The forward side here signifies a direction that is orthogonal to the display surface of the monitor 202 and is assumed from a vehicle compartment space to the monitor 202. The backward side for the monitor 202 signifies a direction that is opposite the forward direction and is therefore assumed from the monitor 202 to the vehicle compartment space.

As above, the base object 274 is placed forward by a specified distance from the display surface of the monitor 202 in the virtual 3D space. According to this configuration, the edge of the base object 274 may be upright provided with an object (wall surface object) as a sidewall connecting with the edge of the display surface of the monitor 202. The wall surface object and the base object 274 are combined to form a boxy object representing a chassis that includes the stereoscopic instrument model to be viewed from the vehicle compartment space. The display surface of the monitor 202 is comparable to an opening of the chassis.

The visual line origin point acquisition portion F3 acquires the visual line origin point information from the occupant camera 203. The visual line origin point acquisition portion F3 acquires the visual line origin point information that may represent the driver's head position or, more specifically, the eye position. The description below assumes the acquisition of information (eye position information) representing the eye position as the visual line origin point information. The eye position information acquired by the visual line origin point acquisition portion F3 is supplied to the rendering portion F4.

Figure 24:
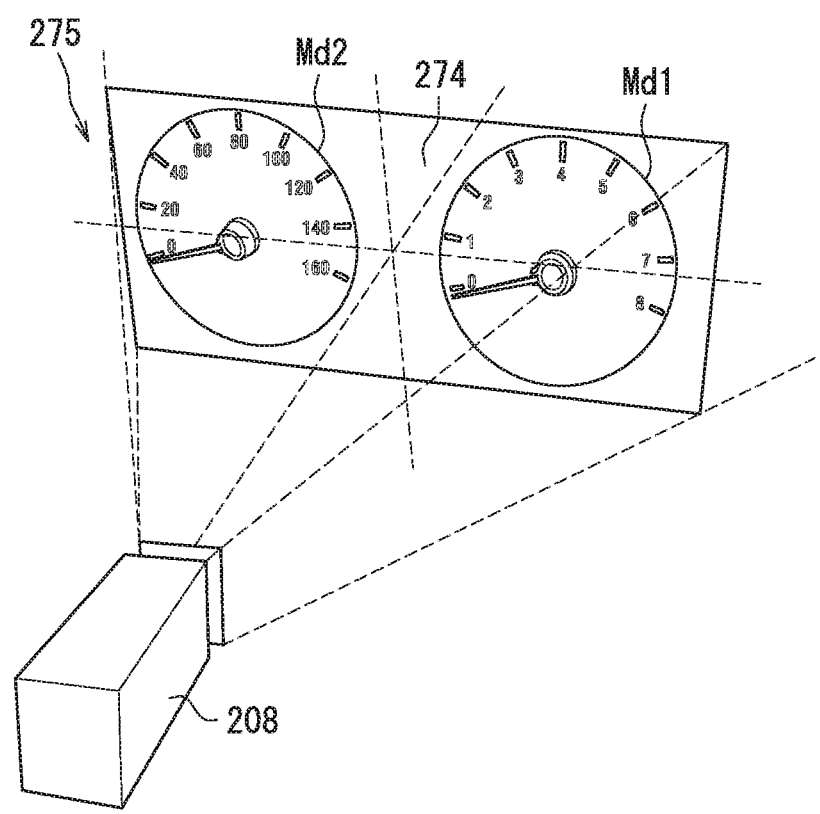
FIG. 24 is a diagram illustrating operations of the rendering portion.

The rendering portion F4 specifies the position and the direction corresponding to the existence of the driver's eye in the virtual 3D space based on the eye position information supplied from the visual line origin point acquisition portion F3. As illustrated in FIG. 24, the specified position of the driver's eye in the virtual 3D space is comparable to a position of the driver's eye relative to the meter unit object 275. In FIG. 24, a camera 208 expresses the driver's viewpoint.

The rendering portion F4 renders an image of the meter unit object 275 viewed from the driver's viewpoint. The rendered image expresses the instrument placed at a specified position in the virtual 3D space provided from the monitor 202 in a mode viewable from the driver at present. FIG. 24 illustrates the mode in which the driver's viewpoint exists in front of the meter unit object 275. The mode in FIG. 24 places tachometer model Md1 to the right of the display screen and speedometer model Md2 to the left of the display screen viewed from the driver. The right and left positions may be interchangeable.

(Display Control Process)

Figure 25:
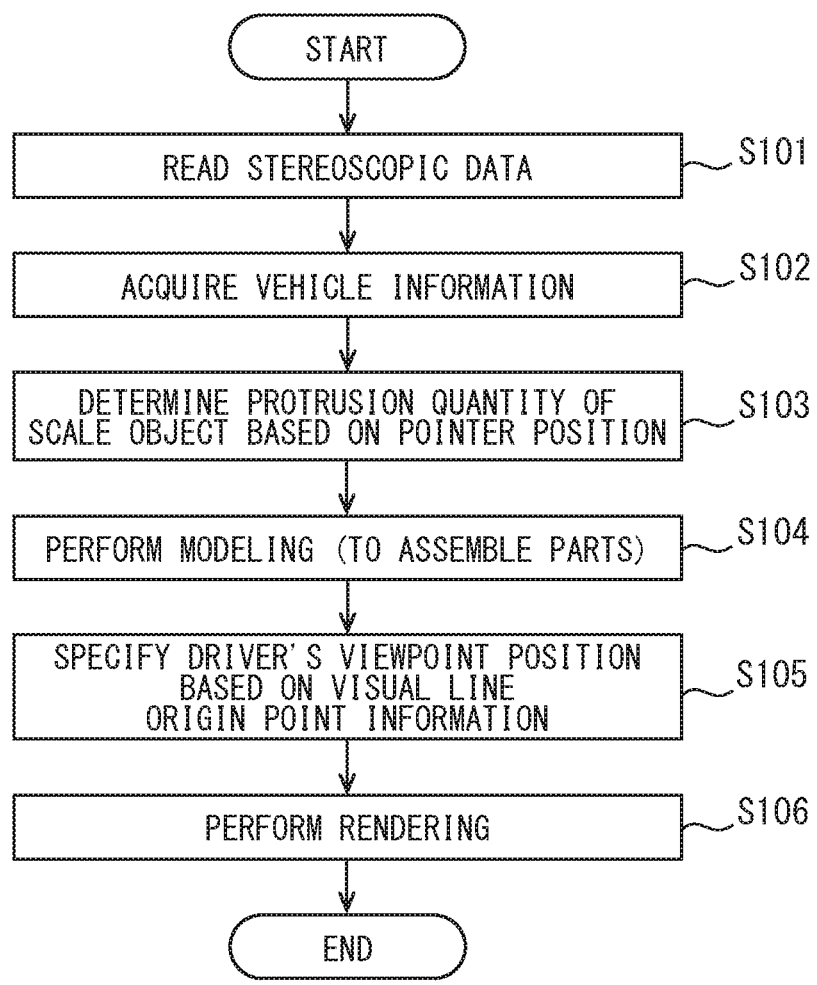
FIG. 25 is a flowchart illustrating a display control process.

The description below explains the display control process performed by the display control process by using a flowchart in FIG. 25. The display control process is to be performed periodically (such as every 100 milliseconds) while an ignition power supply of the vehicle is turned on.

In S101, the modeling portion F2 reads stereoscopic data for parts of the meter to be displayed from the 3D model storage portion 215. According to the present embodiment, the process reads stereoscopic data for parts of the tachometer and the speedometer and then proceeds to S102.

In S102, the vehicle information acquisition portion F1 acquires the vehicle information and proceeds to S103. In S103, the process determines the pointer position in each stereoscopic instrument model and protrusion amount β of the scale object 272. Namely, the process determines the pointer position in each stereoscopic instrument model based on the vehicle information (such as the engine speed or the vehicle speed) acquired by the pointer position determination portion F21 in S102.

The protrusion amount adjustment portion F22 determines protrusion amount β of each scale object corresponding to the pointer position. For example, the process calculates indicated value distance D for each scale object 272 based on the pointer position and sets protrusion amount β corresponding to indicated value distance D. The method described by use of FIG. 23 is used to determine protrusion amount β corresponding to indicated value distance D. The process determines protrusion amount β of the scale object corresponding to the pointer position based on each instrument to be displayed. The process determines protrusion amount β for each scale object 272 and then proceeds to S104.

In S104, the modeling portion F2 generates a stereoscopic instrument model for each instrument to be displayed based on the pointer position and protrusion amount β determined in S103. Namely, tachometer model Md1 and speedometer model Md2 are generated. The process thereby constructs 3D models of the instruments including the scale that protrudes from the base plate toward the pointer by the amount corresponding to the pointer position. The process generates the meter unit object 275 by placing tachometer model Md1 and speedometer model Md2 on the base object 274 and then proceeds to S105.

In S105, the visual line origin point acquisition portion F3 specifies the driver's eye position (hereinafter referred to as the viewpoint) against the meter unit object 275 based on the visual line origin point information supplied from the occupant camera 203 and then proceeds to S105. As above, the eye position may be replaced by the head position.

In S106, the rendering portion F4 renders an image of the meter unit object 275 viewed from the driver's viewpoint, displays the image on the monitor 202, and terminates the process flow. The process displays the image of the meter unit object 275 viewed from the front when the driver's viewpoint exists in front of the meter unit object 275. The process displays the image of the meter unit object 275 viewed below when the driver's viewpoint exists below the front direction for the meter unit object 275.

The front direction for the meter unit object 275 denotes a direction that orthogonally passes through the center of the base object 274 and is assumed from the base object 274 to the vehicle compartment space. The front direction for the meter unit object 275 is comparable to the front direction for the display surface of the monitor 202. In the description below, objects included in the member names are omitted from the members configuring a stereoscopic instrument model displayed on the monitor 202. For example, the base plate object 271 as a display image on the monitor 202 is described as the base plate. The scale object 272 as a display image on the monitor 202 is simply described as the scale. The same applies to the other members including the pointer object 273.

A comparative configuration provides a stereoscopic instrument model so configured that the pointer rotates by keeping predetermined separation distance α from the scale face including scales placed on the same level as the base plate. Effects of the present embodiment will be explained in comparison with a display control device that displays an image of the stereoscopic model viewed from the driver. The comparative configuration is similar to a conventional configuration that prevents the scale from protruding from the base plate.

Figure 26A:
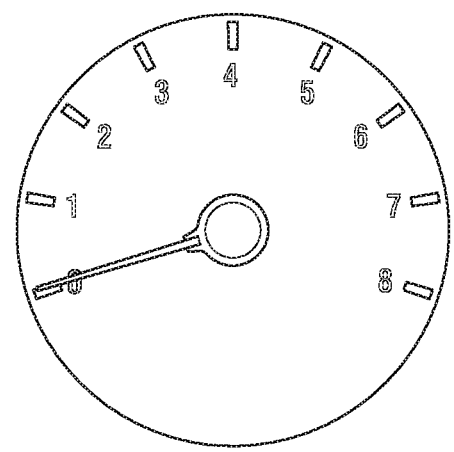
FIG. 26A is a diagram illustrating an effect of the embodiment.
Figure 27A:
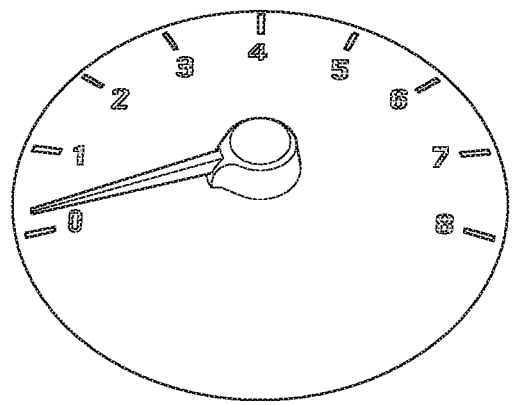
FIG. 27A is a diagram illustrating an operation of a comparative configuration.

As illustrated in FIG. 26A, a tachometer according to the above-mentioned comparative configuration includes a pointer indicating 0 rpm. When the driver's viewpoint exists below the front direction for the monitor, the pointer is displayed at a position upward shifted from the scale "0" due to the gap between the scale face and the pointer as illustrated in FIG. 27A.

Figure 26B:
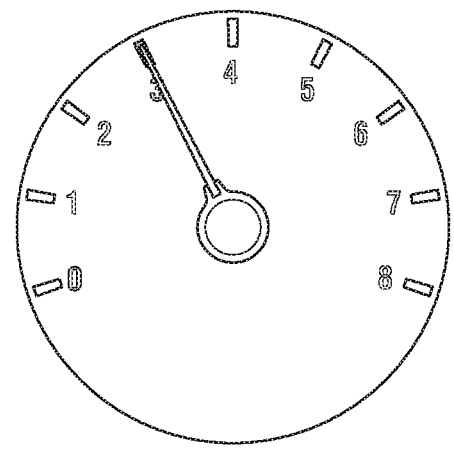
FIG. 26B is a diagram illustrating an effect of the embodiment.
Figure 27B:
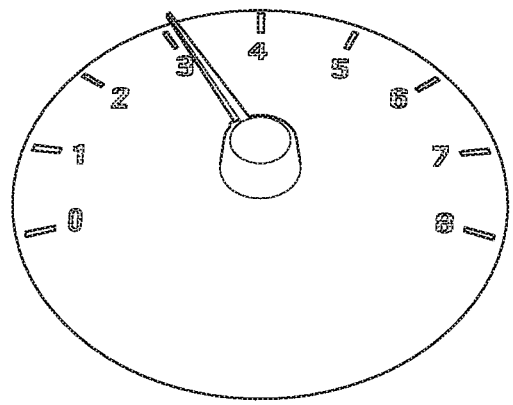
FIG. 27B is a diagram illustrating an operation of a comparative configuration.

Similarly, as illustrated in FIG. 26B, the tachometer according to the comparative configuration includes the pointer indicating 3×1000 rpm. When the driver's viewpoint exists below the front direction for the monitor, the pointer is displayed at a position shifted to the top right from the scale for 3×1000 rpm due to the gap between the scale face and the pointer as illustrated in FIG. 27B.

The visual displacement (on the display screen) between the pointer and the scale contributes to giving a three-dimensional appearance (specifically, a sense of depth) of the instrument image to the driver. However, the driver is forced to hardly recognize the exact numeric value indicated by the pointer. The driver can recognize the pointer indicating near 0 or 3 but hardly recognize the more exact numeric value.

Figure 28A:
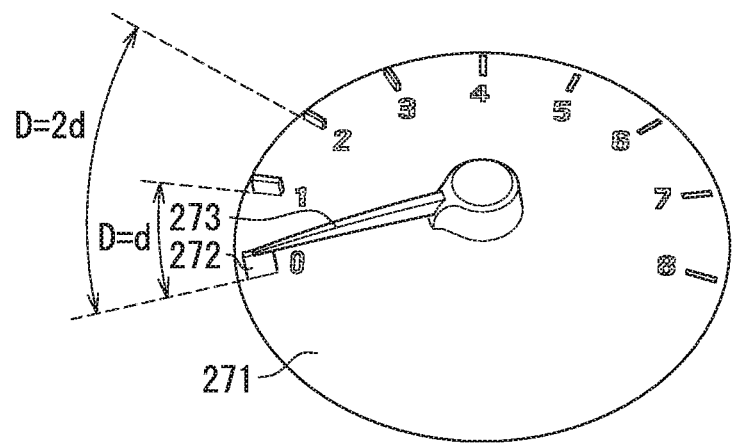
FIG. 28A is a diagram illustrating an operation of the embodiment.

According to the present embodiment, however, the scale close to the pointer is displayed to protrude from the base plate. As illustrated in FIG. 26A, the tachometer includes the pointer indicating 0 rpm. In this situation, as illustrated in FIG. 28A, the instrument image is rendered based on a 3D model that protrudes the scale associated with 0 close to the pointer. As illustrated in FIG. 26B, the tachometer includes the pointer indicating 3000 rpm. In this situation, as illustrated in FIG. 28B, the instrument image is rendered based on a 3D model that protrudes the scale associated with 3000 rpm close to the pointer.

Figure 28B:
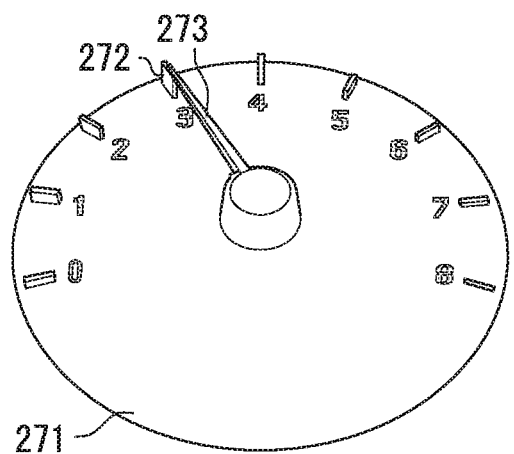
FIG. 28B is a diagram illustrating an operation of the embodiment.

The above-mentioned configuration displays the scale close to the pointer to be protruded stereoscopically as illustrated in FIGS. 28A and 28B even when the driver's viewpoint exists below the front direction for the monitor. This display mode suppresses a distance in depth between the pointer and the scale close to the pointer. The driver can easily recognize the exact scale (or the numeric value) indicated by the pointer.

The configuration according to the present embodiment can display a three-dimensional instrument image and concurrently prevent the visibility of the vehicle information from degrading due to a separation between the base plate and the pointer. The effect of the present embodiment has been described by use of the example of displaying the tachometer. However, the same applies to the other types of instruments (such as a speedometer and a water temperature gauge).

The above-mentioned embodiment maximizes protrusion amount β for the scale object 272 closest to the pointer and gradually decreases heights of the other scale objects 272 in proportion to a distance from the pointer. According to this configuration, protrusion amount β of each scale object 272 varies with a rotation of the pointer. The realistic sensation given to the driver can be improved because protrusion amount β of the scales dynamically varies with the pointer positions. As a result, commercial value can be increased.

According to the example of the curve in FIG. 23, the rule to determine protrusion amount β corresponding to the pointer position sets protrusion amount β approximately to α when indicated value distance D ranges from 0 to 0.5 d. This is because the curve is shaped to rise upward at indicated value distance D set to 0 and approximate protrusion amount β to α corresponding to indicated value distance D ranging from 0 to 0.5 d. According to this configuration, when the pointer object 273 indicates an intermediate numeric value between two scales, the two scale objects 272 are both displayed to protrude to the same height as the pointer. The two scale objects 272 are displayed in a mode that protrudes the two scales sandwiching the pointer to the same height as the pointer. In this display mode, the driver can easily recognize that the pointer indicates an intermediate numeric value between the two scales. The scale object 272 is protruded to the plane where the pointer object 273 rotates when the scale object 272 is positioned to be distant from the pointer object 273 (more specifically, its tip) by less than or equal to a half of the scale interval. Consequently, the driver can easily recognize the numeric value indicated by the pointer.

As above, the configuration of the present embodiment can prevent the visibility of the vehicle information from degrading due to separation distance α between the base plate and the pointer. It is possible to alleviate restrictions on separation distance α to ensure the visibility of the vehicle information. Therefore, separation distance α between the base plate and the pointer can be set to a value larger than an actual instrument. An increase in separation distance α between the base plate and the pointer can increase a sense of depth provided by the stereoscopic instrument model. The present embodiment can increase separation distance α between the base plate and the pointer and display an instrument image providing a more attractive three-dimensional appearance.

The above-mentioned operations of the display control device 201 are applicable when the instrument image displays certain vehicle information. The instrument image may not be necessarily used as the display mode of the vehicle information even if the instrument image can display the vehicle information (such as vehicle speed). Depending on cases, the display mode may use the instrument image (or the analog meter) or a digital meter form. The display mode of the vehicle information may be controlled depending on the number of pieces of vehicle information displayed on the monitor 202 or the combination.

For example, an analog meter is used to display the vehicle speed when the number of pieces of vehicle information displayed on the monitor 202 is smaller than or equal to a predetermined number (such as 3). Meanwhile, a digital meter format may be used for display when the number of pieces of the vehicle information to be displayed is larger than or equal to the predetermined number. The display in the digital meter format requires a smaller display space than the analog meter and can allow the display screen of the monitor to include more information. Types or the number of pieces of information displayed on the monitor 202 may be determined mainly depending on traveling states indicating whether the vehicle is traveling.

A member having the same function as the member already described in the above-mentioned embodiment is depicted by the same reference numeral and a description is omitted for simplicity. When only part of the configuration is described, the configuration of the above-mentioned embodiment can be applied to the other parts.

(Fifteenth Modification)

Figure 29:
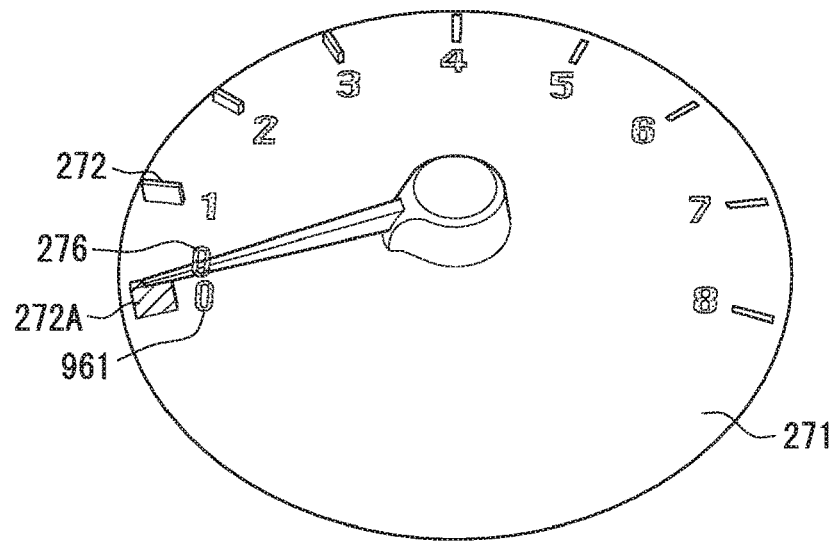
FIG. 29 is a diagram illustrating an operation of a fifteenth modification.

When viewed from the front, if the pointer body portion 931 overlaps with a numeric value corresponding to the scale, the modeling portion F2 of the display control device 201 may generate a 3D model including a character object 276 representing that numeric value to be higher (or more front) than the pointer body portion 931 of the pointer object 273. This configuration allows the display screen to floatingly display the numeric value at the position overlapping with the pointer as illustrated in FIG. 29. Therefore, it is possible to reduce a possibility where the pointer object 273 hides a numeric value and the driver difficultly reads the numeric value near the pointer.

The display control device 201 may floatingly display a numeric value overlapping with the pointer object 273 to be the side higher than the pointer object 273. The higher side denotes a direction from the base plate object 271 to the pointer object 273 and corresponds to the same direction as the front.

Figure 30:
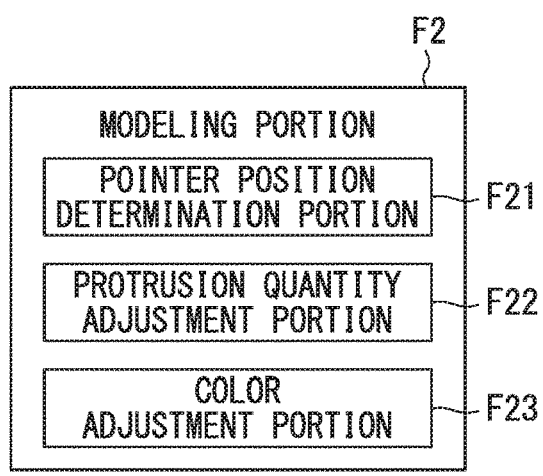
FIG. 30 is a block diagram illustrating a configuration of a modeling portion according to the fifteenth modification.

A color adjustment portion F23 is advantageously provided for the modeling portion F2 configured to floatingly display a numeric value overlapping with the pointer object 273. As illustrated in FIG. 30, the color adjustment portion F23 adjusts a color tone for each part configuring the stereoscopic instrument model. The color adjustment portion F23 sets up that the character object 276 to float uses a color tone different from a color tone for the other numeric values. Out of a plurality of the scale objects 272, a scale object 272A corresponding to the character object 276 is configured to use the same color or the similar type of color as the character object 276. The color adjustment portion F23 unify colors of the character objects 276 and the scale object 272A corresponding to the character object 276. This mode allows the driver to more easily recognize the correspondence relationship between the scale and the numeric value indicated by the pointer.

As a premise, there are predetermined default colors (hereinafter referred to as basic character colors) for numeric values and default colors (hereinafter referred to as basic scale colors) for scale objects 272. The color adjustment portion F23 uses a color different from the basic character color and the basic scale color for the character object 276 to float. For example, when the basic character color is blue and the basic scale color is black, the color of the character object 276 is configured as green and the color of the scale object 272A is configured as darker green (with reduced intensity and saturation). The similar type of color is characterized by the same hue and the different intensity or saturation.

When viewed from the front, if a numeric value associated with the scale does not overlap with the pointer body portion 931, the display control device 201 may use a mode to display the numeric value to float to the same height as the tip of the scale object 272 corresponding to the numeric values. In this case, the modeling portion F2 generates a stereoscopic instrument model that places the character object 276 indicating the numeric value associated with the scale upper from the base plate surface by protrusion amount β assigned to the scale object 272 associated with the numeric value. This mode also makes it possible to easily recognize the correspondence relationship between the scale and the numeric value. When the numeric value is displayed to float from the base plate surface, the original position to place the numeric value on the base plate surface is favorably shadowed or is provided with an object 961 comparable to a dimmed version of the floated character object 276.

(Sixteenth Modification)

The above-mentioned embodiment has disclosed the mode of changing protrusion amount β correspondingly to the distance from the pointer object 273, but not limited thereto. For example, protrusion amount β for each scale object 272 may be unexceptionally set to a predetermined value (such as 0.5α) larger than 0 regardless of positions of the pointer object 273.

This mode also displays at least the scale close to the pointer to protrude from the base plate. The distance between the scale and the plane to place the pointer is smaller than the separation between the base plate and the pointer. It is possible to suppress the degree of a visual shift between the pointer and the scale due to the driver's viewpoint positions. It is possible to inhibit the visibility of the vehicle information from degrading due to a separation between the base plate and the pointer.

(Seventeenth Modification)

Figure 31:
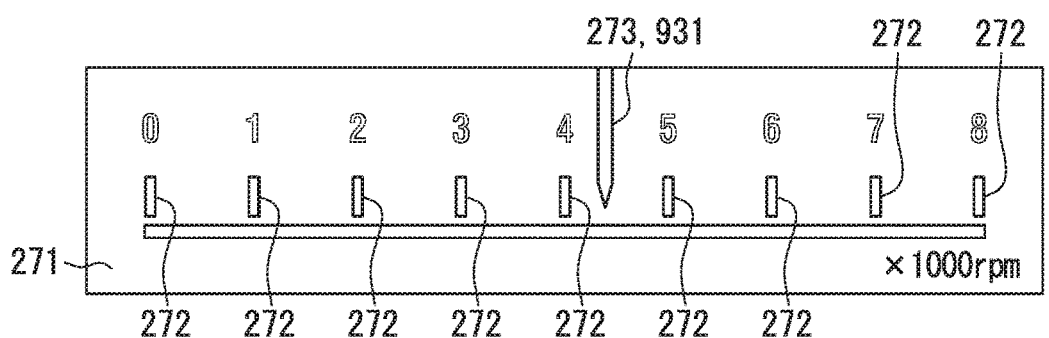
FIG. 31 is a diagram illustrating a configuration of a seventeenth modification.

The above-mentioned embodiments mainly have illustrated the mode of rendering the instrument image simulating the type of an analog meter including the pointer rotating over the scale face, but not limited thereto. As illustrated in FIG. 31, the instrument image may simulate the type of an analog meter (bar-type meter) that allows the pointer to move over a bar-type scale face including linearly placed scales.

(Eighteenth Modification)

The above-mentioned rendering portion F4 may detect the direction of a light source existing outside the monitor 202 and render an image mainly reflecting the pointer shadow resulting from the light source, a mode of instrument gloss, or a mode of reflected light reflecting off the instrument.

The flowcharts or the processing depicted in the flowcharts described in the present disclosure include a plurality of sections (also referred to as steps) each of which is expressed as S1 or the like. Each of the sections can further be divided into a plurality of subsections, or a plurality of sections can be combined together to configure a single section. These sections can alternatively be referred to as circuits, devices, modules, or means.

Also, each or a combination of the plurality of portions may be implemented as (i) a portion of software in combination with a hardware unit (for example, a computer), as well as (ii) a portion of hardware (for example, an integrated circuit, a wired logic circuit), with or without the functionality of the associated device. Further, the hardware part can be configured inside the microcomputer.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A vehicle display device comprising:
   a display portion attached to a vehicle; and
   a processor configured to:
   acquire a position of a driver's viewpoint of the display portion relative to a reference viewpoint, determine a change in the position of the driver's viewpoint from the reference viewpoint, and determine an amount of angular change from the reference viewpoint to the driver's viewpoint, the driver's viewpoint being a position where a driver's line of sight is to a central position of the display portion, and the driver's line of sight from the reference viewpoint to the display portion being perpendicular to the display portion;
   acquire image data for generating display images to be displayed on the display portion; and
   generate the display images based on the image data and display the display images on the display portion, wherein:
   the image data includes movement suppression image data and movement promotion image data, each of the display images generated from the movement suppression image data being displayed as at least one of (i) rotated about a center of rotation by a first angle of rotation and (ii) moved a first movement amount, based on the change in the position of the driver's viewpoint from the reference viewpoint, and each of the display images generated from the movement promotion image data being displayed as at least one of (i) rotated about a center of rotation by a second angle of rotation and (ii) moved a second movement amount, based on the change in the position of the driver's viewpoint from the reference viewpoint;

the processor is further configured to determine the first angle of rotation and the second angle of rotation based on the change in the position of the driver's viewpoint from the reference viewpoint;

the processor is further configured to determine the first movement amount and the second movement amount based on the change in the position of the driver's viewpoint from the reference viewpoint;

the first angle of rotation is less than the second angle of rotation;

the first movement amount is less than the second movement amount; and in response to the position of the driver's viewpoint changing from the reference viewpoint, the processor is further configured to generate the display images based on the movement suppression image data rotated about the centers of rotation by the first angle of rotation and to generate the display images based on the movement promotion image data rotated about the centers of rotation by the second angle of rotation, and to display the rotated display images on the display portion.

2. A vehicle display device comprising:

a display portion attached to a vehicle; and a processor configured to:

acquire an acceleration occurring on the vehicle;

acquire image data for generating display images to be displayed on the display portion; and generate the display images based on the image data and display the display images on the display portion, wherein:

the image data includes movement suppression image data and movement promotion image data, each of the display images generated from the movement suppression image data being displayed as at least one of (i) rotated about a center of rotation by a first angle of rotation and (ii) moved a first movement amount, based on the acquired acceleration, and each of the display images generated from the movement promotion image data being displayed as at least one of (i) rotated about a center of rotation by a second angle of rotation and (ii) moved a second movement amount, based on the acquired acceleration;

the processor is further configured to determine the first angle of rotation and the second angle of rotation based on the acquired acceleration;

the processor is further configured to determine a first movement amount and the second movement amount based on the acquired acceleration;

the first angle of rotation is less than the second angle of rotation;

the first movement amount is less than the second movement amount; and in response to acquiring the acceleration, the processor is further configured to generate the display images based on the movement suppression image data rotated about the centers of rotation by the first angle of rotation and to generate the display images based on the movement promotion image data rotated about the centers of rotation by the second angle of rotation, and to display the rotated display images on the display portion.

3. The vehicle display device according to claim 1, wherein:

the processor is further configured to determine the first angle of rotation by multiplying the amount of angular change from the reference viewpoint to the driver's viewpoint by a coefficient less than one and greater than or equal to zero; and the processor is further configured to determine the second angle of rotation by multiplying the amount of angular change from the reference viewpoint to the driver's viewpoint by a coefficient greater than one.

4. The vehicle display device according to claim 1, wherein:

the processor is further configured to determine the first angle of rotation as the amount of angular change from the reference viewpoint to the driver's viewpoint; and the processor is further configured to determine the second angle of rotation by multiplying the amount of angular change from the reference viewpoint to the driver's viewpoint by a coefficient greater than one.

5. The vehicle display device according to claim 1, wherein the processor is further configured to determine that the first movement amount of the display images generated from the movement suppression image data is zero regardless of the change in the position of the driver's viewpoint from the reference viewpoint.

6. The vehicle display device according to claim 1, wherein the first movement amount and the second movement amount are based on the amount of angular change from the reference viewpoint to the driver's viewpoint; and in response to the position of the driver's viewpoint changing from the reference viewpoint, the processor is further configured to determine a direction from the reference viewpoint to the driver's viewpoint, move the display images generated from the movement promotion image data by the second movement amount on the display portion in a direction opposite to the direction from the reference viewpoint to the driver's viewpoint, and either (i) move the display images generated from the movement suppression image data by the first movement amount on the display portion in the direction from the reference viewpoint to the driver's viewpoint or (ii) not move the display images generated from the movement suppression image data on the display portion.

7. The vehicle display device according to claim 2, wherein the processor is further configured to acquire a lateral acceleration of the vehicle, determine the first angle of rotation and the second angle of rotation based on the lateral acceleration of the vehicle, to generate the display images based on the movement suppression image data rotated about the centers of rotation by the first angle of rotation to generate the display images based on the movement promotion image data rotated about the centers of rotation by the second angle of rotation, and to display the rotated display images on the display portion.

8. The vehicle display device according to claim 2, wherein
the processor is further configured to determine that the first movement amount of the display images generated from the movement suppression image data is zero regardless of the acquired acceleration.

9. The vehicle display device according to claim 7, wherein
in response to acquiring the lateral acceleration, the processor is further configured to
determine the first movement amount and the second movement amount based on the acquired lateral acceleration,
determine a direction of the acquired lateral acceleration,
move the display images generated from the movement promotion image data by the second movement amount on the display portion in a direction opposite the direction of the lateral acceleration; and
either (i) move the display images generated from the movement suppression image data by the first movement amount on the display portion in the direction of the lateral acceleration or (ii) not move the display images generated from the movement suppression image data on the display portion.

10. The vehicle display device according to claim 1, wherein:
the centers of rotation of the display images generated from the movement suppression image data are disposed on the display portion to appear closer to the driver's viewpoint than the centers of rotation of the display images generated from the movement promotion image data.

11. The vehicle display device according to claim 10, wherein
the processor is further configured to display the display images generated from the movement promotion image data further in depth on the display portion than the display images generated from the movement suppression image data.

12. The vehicle display device according to claim 1, wherein
the processor is further configured to always display the display images generated from the movement suppression image data on the display portion to appear closer to the position of the driver's viewpoint than the display images generated from the movement promotion image data.

* * * * *